US010591373B2

(12) United States Patent
Meyer et al.

(10) Patent No.: US 10,591,373 B2
(45) Date of Patent: Mar. 17, 2020

(54) LOAD TRANSDUCER HAVING A BIASING ASSEMBLY

(71) Applicant: MTS SYSTEMS CORPORATION, Eden Prairie, MN (US)

(72) Inventors: Richard A. Meyer, Chaska, MN (US); Robert L. Josephson, Savage, MN (US); Jason A. Christopherson, Eden Prairie, MN (US); Todd Robert Osmundson, Cumberland, WI (US); Nicholas Devon LaMoore, Minneapolis, MN (US); Riley August Rogotzke, Lakeville, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 38 days.

(21) Appl. No.: 15/449,644

(22) Filed: Mar. 3, 2017

(65) Prior Publication Data

US 2017/0191889 A1 Jul. 6, 2017

Related U.S. Application Data

(63) Continuation-in-part of application No. 14/449,849, filed on Aug. 1, 2014, now Pat. No. 9,778,122.
(Continued)

(51) Int. Cl.
*G01M 9/02* (2006.01)
*G01L 5/168* (2020.01)
(Continued)

(52) U.S. Cl.
CPC ............ *G01L 5/168* (2013.01); *G01L 1/2206* (2013.01); *G01L 1/26* (2013.01); *G01L 5/16* (2013.01);
(Continued)

(58) Field of Classification Search
CPC combination set(s) only.
See application file for complete search history.

(56) References Cited

U.S. PATENT DOCUMENTS 3,377,849 A 4/1968 Lebow
3,613,443 A 10/1971 Curry
(Continued)

FOREIGN PATENT DOCUMENTS

FR 2490342 3/1982
GB 2087085 5/1982
(Continued)

OTHER PUBLICATIONS

Invitation to Pay Additional Fees dated Nov. 20, 2014 for corresponding International Application No. PCT/US2014/049447, filed Aug. 1, 2014.
(Continued)

*Primary Examiner* — Lisa M Caputo
*Assistant Examiner* — Tran M. Tran
(74) *Attorney, Agent, or Firm* — Steven M. Koehler; Westman, Champlin & Koehler, P.A.

(57) ABSTRACT

In one aspect, a transducer body, includes a support including a pair of clevis halves; and a sensor body coupled to each of the clevis halves. The sensor body is disposed between the clevis halves and includes a generally rigid peripheral member disposed about a spaced-apart central hub, the central hub being joined to each of the clevis halves with the peripheral member spaced apart from each clevis half, where at least three flexure components couple the peripheral member to the central hub, and where the flexure components are spaced-apart from each other at generally equal angle intervals about the central hub. A biasing assembly connected between the support and the sensor body is configured to provide a bias force between the sensor body and the support.

20 Claims, 39 Drawing Sheets

Related U.S. Application Data

(60) Provisional application No. 62/303,159, filed on Mar. 3, 2016, provisional application No. 62/031,642, filed on Jul. 31, 2014, provisional application No. 61/861,221, filed on Aug. 1, 2013.

(51) Int. Cl.
*G01M 9/06* (2006.01)
*G01L 1/26* (2006.01)
*G01L 1/22* (2006.01)
*G01M 17/007* (2006.01)
*G01L 5/16* (2020.01)

(52) U.S. Cl.
CPC .............. *G01M 9/02* (2013.01); *G01M 9/062* (2013.01); *G01M 17/007* (2013.01)

(56) References Cited

U.S. PATENT DOCUMENTS

| | | | |
|---|---|---|---|
| 3,618,376 A | 11/1971 | Shull et al. | |
| 3,693,425 A | 9/1972 | Starita | |
| 3,771,359 A | 11/1973 | Shoberg | |
| 3,780,573 A | 12/1973 | Reus | |
| 3,867,838 A | 2/1975 | Gerresheim | |
| 3,939,704 A | 2/1976 | Zipin | |
| 3,956,930 A | 5/1976 | Shoberg | |
| 3,985,025 A | 10/1976 | Ormond | |
| 4,023,404 A | 5/1977 | Brendel | |
| 4,066,140 A | 1/1978 | Conley | |
| 4,107,986 A | 8/1978 | Jones | |
| 4,143,727 A | 3/1979 | Jacobson | |
| 4,161,874 A | 7/1979 | Specker et al. | |
| 4,171,641 A | 10/1979 | Landsness | |
| 4,259,863 A | 4/1981 | Rieck et al. | |
| 4,297,877 A | 11/1981 | Stahl | |
| 4,448,083 A | 5/1984 | Hayashi | |
| 4,449,597 A * | 5/1984 | Ricciardi | G01G 21/161 177/170 |
| 4,488,441 A | 12/1984 | Ramming | |
| 4,493,220 A | 1/1985 | Carignan et al. | |
| 4,499,759 A | 2/1985 | Hull | |
| 4,544,043 A * | 10/1985 | Stuart | G01G 3/1402 177/194 |
| 4,550,617 A | 11/1985 | Fraignier et al. | |
| 4,558,600 A * | 12/1985 | Lee | G01G 3/12 177/210 C |
| 4,573,362 A | 3/1986 | Amlani | |
| 4,616,511 A | 10/1986 | Gindy et al. | |
| 4,640,138 A | 2/1987 | Meyer et al. | |
| 4,649,759 A * | 3/1987 | Lee | G01G 3/12 177/210 C |
| 4,672,855 A | 6/1987 | Schmieder | |
| 4,706,506 A | 11/1987 | Lestelle | |
| 4,748,844 A | 6/1988 | Yoshikawa et al. | |
| 4,763,531 A | 8/1988 | Dietrich et al. | |
| 4,811,608 A | 3/1989 | Hilton | |
| 4,821,582 A | 4/1989 | Meyer et al. | |
| 4,823,618 A | 4/1989 | Ramming | |
| 4,879,906 A * | 11/1989 | Meline | G01B 5/0011 73/826 |
| 4,976,412 A | 12/1990 | Simon | |
| 4,979,580 A | 12/1990 | Lockery | |
| 5,020,357 A * | 6/1991 | Kovacevic | G01L 25/00 73/1.15 |
| 5,313,828 A | 5/1994 | Kotzle et al. | |
| 5,315,882 A | 5/1994 | Meyer et al. | |
| 5,319,161 A | 6/1994 | Miller et al. | |
| 5,335,557 A | 8/1994 | Yasutake | |
| 5,342,017 A | 8/1994 | McCalmont et al. | |
| 5,400,661 A | 3/1995 | Cook et al. | |
| 5,540,108 A | 7/1996 | Cook et al. | |
| 5,591,924 A | 1/1997 | Hilton | |
| 5,762,784 A | 6/1998 | Jowett | |
| 5,894,094 A | 4/1999 | Kuchler et al. | |
| 5,923,000 A | 7/1999 | Tschopp et al. | |
| 5,952,567 A | 9/1999 | Meyer et al. | |
| 5,962,784 A | 10/1999 | Hulsing, II | |
| 5,969,268 A | 10/1999 | Sommerfeld et al. | |
| 5,974,879 A | 11/1999 | Hulsing, II | |
| 5,987,986 A * | 11/1999 | Wyse | G01C 19/5719 73/504.12 |
| 6,038,933 A | 3/2000 | Meyer | |
| 6,109,115 A | 8/2000 | Miyazaki | |
| 6,324,919 B1 | 12/2001 | Larsen et al. | |
| 6,331,682 B1 | 12/2001 | Hopkins et al. | |
| 6,417,466 B2 * | 7/2002 | Gross | G01G 3/12 177/211 |
| 6,532,830 B1 | 3/2003 | Jansen et al. | |
| 6,536,292 B1 | 3/2003 | Richards et al. | |
| 6,568,274 B1 * | 5/2003 | Lucas | G01L 9/0072 73/718 |
| 6,600,112 B2 | 7/2003 | Iseli | |
| 6,662,655 B2 * | 12/2003 | Foote | F16F 15/02 248/604 |
| 6,699,235 B2 | 3/2004 | Wallace et al. | |
| 6,759,603 B2 | 7/2004 | Curtis et al. | |
| 6,769,312 B2 | 8/2004 | Meyer et al. | |
| 6,843,126 B2 * | 1/2005 | Hulsing, II | F02G 1/044 73/504.04 |
| 6,845,675 B2 | 1/2005 | Meyer et al. | |
| 7,017,220 B2 | 3/2006 | Alexander et al. | |
| 7,166,809 B2 | 1/2007 | Desire et al. | |
| 7,348,502 B2 | 3/2008 | Meyer et al. | |
| 7,501,615 B2 * | 3/2009 | Cleveland | B82Y 35/00 250/216 |
| 7,652,409 B2 * | 1/2010 | Dixon | B41J 25/001 310/328 |
| 7,683,273 B2 | 3/2010 | Hulburt et al. | |
| 7,726,205 B2 | 6/2010 | Meyer et al. | |
| 7,788,984 B2 | 9/2010 | Meyer | |
| 7,918,143 B2 | 4/2011 | Meyer et al. | |
| 7,971,851 B2 | 7/2011 | Arnett et al. | |
| 7,975,397 B2 | 7/2011 | Meyer et al. | |
| 7,989,713 B2 | 8/2011 | Hulburt et al. | |
| 8,276,466 B2 | 10/2012 | Kurtz | |
| 8,525,051 B2 | 9/2013 | Hauck et al. | |
| 8,640,553 B2 | 2/2014 | Barnett | |
| 8,800,346 B2 | 8/2014 | Murashige | |
| 8,919,210 B2 | 12/2014 | Kjar | |
| 9,612,150 B2 | 4/2017 | Perrea et al. | |
| 2002/0092348 A1 | 7/2002 | Ulman | |
| 2002/0184952 A1 * | 12/2002 | Leist | G01M 7/04 73/662 |
| 2005/0120608 A1 | 6/2005 | Meyer et al. | |
| 2007/0039400 A1 | 2/2007 | Meyer et al. | |
| 2009/0088899 A1 * | 4/2009 | Johansson | B25J 13/085 73/862.381 |
| 2010/0109395 A1 * | 5/2010 | Ruthinowski | B60N 2/2809 297/216.11 |
| 2010/0326206 A1 | 12/2010 | Meyer et al. | |
| 2015/0017806 A1 | 1/2015 | Akutsu et al. | |
| 2015/0033875 A1 | 2/2015 | Meyer et al. | |
| 2015/0160083 A1 | 6/2015 | Meyer et al. | |
| 2016/0334267 A1 | 11/2016 | Mamich et al. | |

FOREIGN PATENT DOCUMENTS

| | | |
|---|---|---|
| WO | 9904235 | 1/1999 |
| WO | 2015017806 | 2/2015 |

OTHER PUBLICATIONS

International Search Report and Written Opinion dated Mar. 5, 2015, for corresponding International Application No. PCT/US2014/049447, filed Aug. 1, 2014.

Cantilever Mounted Bi-Axial Force Transducer with Near Parallel Translation, IBM Technical Disclosure Bulletin, vol. 33, No. 11, Apr. 1, 1991, pp. 481-483.

(56) References Cited

OTHER PUBLICATIONS

Brochure: Wheel force transducer—the key for real world simulation, Schenck ATC, Apr. 1995.
T. Liang et al., "Transducer for Surface Force Measurement", Agricultural Engineering, vol. 46, No. 1112, Dec. 1965, St. Joseph, US, pp. 688-691.
"MMS-6800", Nissho Electric Works, Col. Ltd., 1997.
JSAE Review, Official Journal of the Society of Automotive Engineers of Japan, Inc., vol. 16, 1995, pp. 83-89.
"Flexible Wheel Force Transducer System for Road Load Data Acquisition", IGEB, Apr. 1995.
A. Rupp. V. Grubisic, "Reliable and Efficient Measurement of Suspension Loads on Passenger Cars and Commercial Vehicles", reprint from "Advanced Measurement Techniques and Sensory Systems for Automotive Applications: Accuracy and Reliability", Proceeding the 1st International Conference and Exhibition. Ancona Jun. 29-30, 1995, Hrsg. ATA Orbassano (1995), S. 263-273.
A. Rupp, W. Diefenbach, V. Grubisic, "Erfassung der mehraxialen Fahrbetriebsbelastungen mit dem MeBrad VELOS", ATZ Automobiltechnische Zeitschrift 96, 1994, pp. 764-768.
Wurll, "Tacticle Force-Torque Sensor for Performing Control Tasks in Robotics", XP002210941, vol. 15, No. 3, pp. 120-125, 1986.
Assorted Astek Engineering, Inc. brochures, 1983.
G. Hirzinger, "Direct Digital Robot Control Using a Force-Torque-Sensor", IFAC Symposium on Real Time Digital Control Applications, Guadalajara, Mexico, Jan. 15-21, 1983.
Milton J. Lebow, "Summer Instrument-Automation Conference and Exhibit—Toronto, Ontario, Canada", Instrument Society of America Conference Preprint, Jun. 5-8, 1961.
Waiter Weiblen, Thomas Hofmann, "Evaluation of Different Designs of Wheel Force Transducers", SAE Technical Paper Series, International Congress and Exposition, Feb. 23-26, 1998, pp. 1-10.
Brochure: "Kistler Vehicle Engineering News", May 1997.
Notification of Transmittal of the International Search Report and the Written Opinion of the International Searching Authority from PCT/US2017/020743, dated Mar. 3, 2017.

* cited by examiner

LOAD TRANSDUCER HAVING A BIASING ASSEMBLY

CROSS-REFERENCE TO RELATED APPLICATION

This application is a continuation-in-part of US. patent application Ser. No. 14/449,849 filed Aug. 1, 2014. This application claims the benefit of U.S. Provisional patent application Ser. No. 61/861,221, entitled "TWO-AXIS SENSOR BODY FOR A LOAD TRANSDUCER" filed Aug. 1, 2013, U.S. Provisional patent application Ser. No. 62/031,642, entitled "TWO-AXIS SENSOR BODY FOR A LOAD TRANSDUCER" filed Jul. 31, 2014, and U.S. Provisional patent application Ser. No. 62/303,159, entitled "TWO-AXIS SENSOR BODY FOR A LOAD TRANSDUCER" filed Mar. 3, 2016. The contents of each of foregoing applications are incorporated herein by reference in their entireties.

BACKGROUND OF THE INVENTION

The discussion below is merely provided for general background information and is not intended to be used as an aid in determining the scope of the claimed subject matter.

The present disclosure relates to devices that transmit and measure linear forces along and moments about three orthogonal axes. More particularly, the present disclosure relates to devices that are particularly well suited to measure forces and moments upon a test specimen in a test environment, such as but not limited to in a wind tunnel.

The measurement of loads, both forces and moments, with accuracy and precision is important to many applications. A common use, where several moments and forces need to be measured, is in the testing of specimens in a wind tunnel. Test specimens can be placed on a platform balance located in a pit of the wind tunnel. The platform balance can be arranged to receive a model of a vehicle, a vehicle, or other actual or modeled test specimen.

If the test specimen is a vehicle with wheels, the platform balance can be equipped with a rolling belt to rotate the wheels, which can make a significant improvement in measurement accuracy.

Six components of force and moment act on a test specimen on the platform balance in the wind tunnel. These six components are known as lift force, drag force, side force, pitching moment, yawing moment, and rolling moment. The moments and forces that act on the test specimen are usually resolved into three components of force and three components of moment with transducers that are sensitive to the components. Each of the transducers carries sensors, such as strain gauges, that are connected in combinations that form Wheatstone bridge circuits. By appropriately connecting the sensors, resulting Wheatstone bridge circuit unbalances can be resolved into readings of the three components of force and three components of moment.

Platform balances have a tendency to be susceptible to various physical properties of the test environment that can lead to inaccurate measurements without additional compensation. For example, temperature transients in the wind tunnel can result in thermal expansion of the platform balance that can adversely affect the transducers. In addition, large test specimens are prone to create large thrust loads on the transducers that can cause inaccurate measurements.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect is a transducer body, including: a support including a pair of clevis halves; and a sensor body coupled to each of the clevis halves, where the sensor body is disposed between the clevis halves and includes a generally rigid peripheral member disposed about a spaced-apart central hub, the central hub being joined to each of the clevis halves with the peripheral member spaced apart from each clevis half, where at least three flexure components couple the peripheral member to the central hub, and where the flexure components are spaced-apart from each other at generally equal angle intervals about the central hub; and a biasing assembly connected between the support and the sensor body and configured to provide a bias force between the sensor body and the support.

Another general aspect is a transducer body, including: a support including a pair of clevis halves; and a sensor body coupled to each of the clevis halves, where the sensor body is disposed between the clevis halves and includes a generally rigid peripheral member disposed about a spaced-apart central hub, the central hub being joined to each of the clevis halves with the peripheral member spaced apart from each clevis half, where at least three flexure components couple the peripheral member to the central hub, and where the flexure components are spaced-apart from each other at generally equal angle intervals about the central hub; and a biasing assembly connected between the support and the sensor body and configured to provide a bias force between the sensor body and the support, the biasing assembly including. The transducer body also includes a flexible member fixedly connected to one of the sensor body or the support, the flexible member including a beam cantilevered from one of the sensor body or the support, the cantilevered beam including a plurality of slots therein. The transducer body also includes a biasing connector to couple the flexible member to the other of the support or the sensor body.

Yet another general aspect is a transducer body, including: a support including a pair of clevis halves; and a sensor body coupled to each of the clevis halves, where the sensor body is disposed between the clevis halves and includes a generally rigid peripheral member disposed about a spaced-apart central hub, the central hub being joined to each of the clevis halves with the peripheral member spaced apart from each clevis half, where at least three flexure components couple the peripheral member to the central hub, and where the flexure components are spaced-apart from each other at generally equal angle intervals about the central hub; and a biasing assembly connected between the support and the sensor body and configured to provide a bias force between the sensor body and the support, the biasing assembly including a pair of biasing connectors, where a biasing connector is provided for each of opposite portions of the transducer body that are symmetrical, each biasing connector including a cantilevered beam with one of the biasing connectors connected to one of the flexible members, the cantilevered beam including a plurality of slots therein extending along a length of the cantilevered portion of the beam. One or more of the foregoing features described above can be included in other embodiments as desired.

A platform balance may be provided in another aspect with transducer bodies and aspects as provided above, shown or described.

BRIEF DESCRIPTION OF THE DRAWINGS

FIG. 13 is a circuit diagram of a Wheatstone bridge for the sensor elements of FIG. 9;

DETAILED DESCRIPTION OF THE ILLUSTRATIVE EMBODIMENTS

Figure 1:
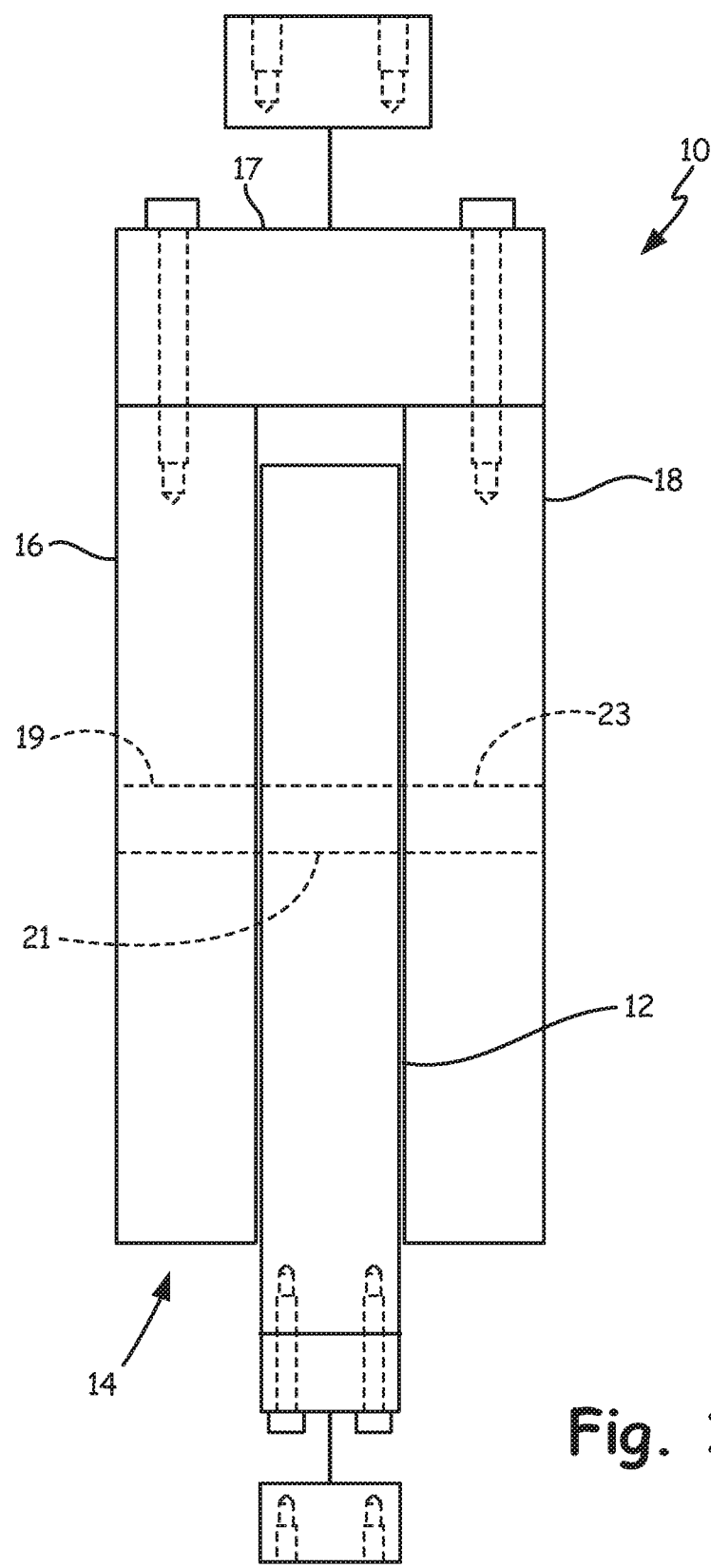
FIG. 1 is a side elevation view of a transducer body according to an embodiment of the present disclosure.
Figure 2:
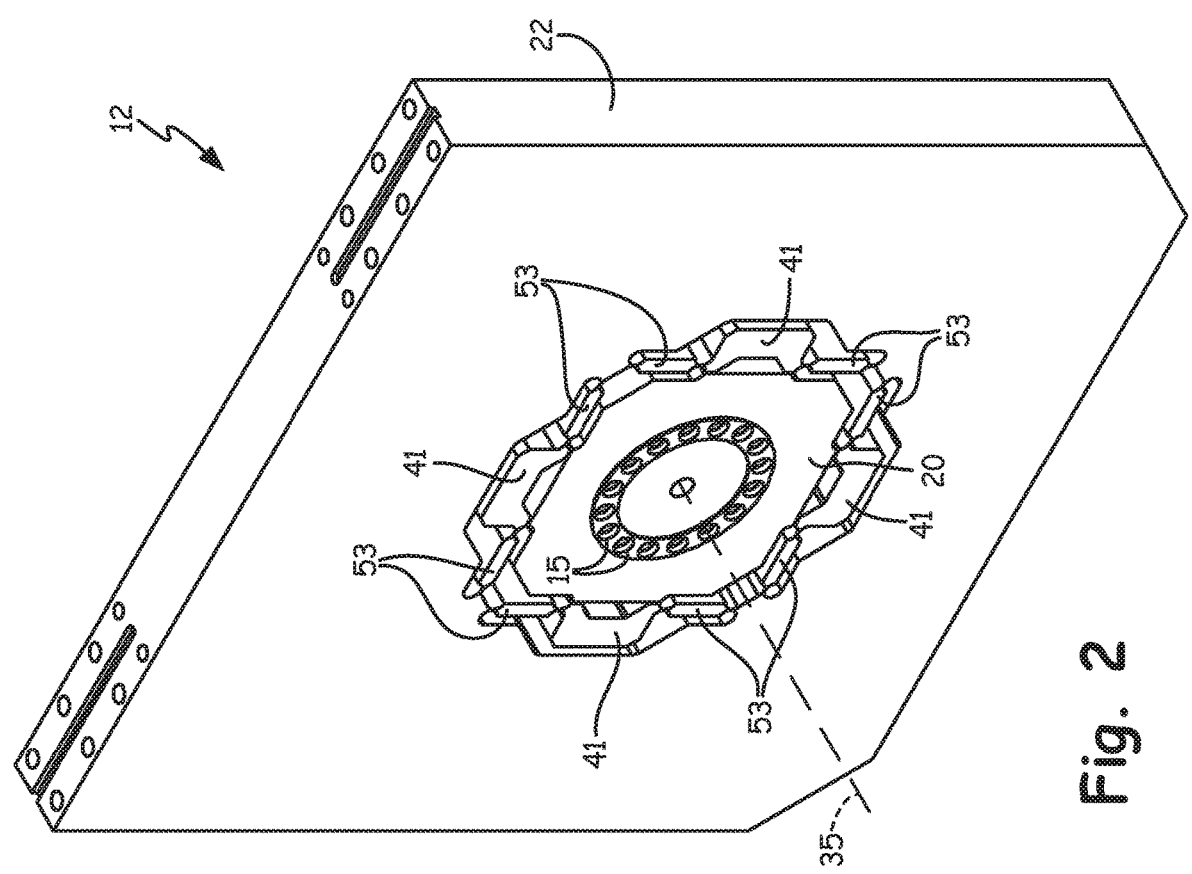
FIG. 2 is a perspective view of a sensor body according to an embodiment of the present disclosure.

Referring to FIG. 1, a transducer assembly is illustrated at 10. The transducer assembly 10 includes a sensor body 12 and a clevis assembly 14. The clevis assembly 14 includes a first clevis half 16 and a second clevis half 18. The clevis halves 16 and 18 are joined together at one end with a connecting member 17. The sensor body 12 is disposed between the clevis halves 16 and 18, where the sensor body 12 and clevis halves 16 and 18 are joined together with a suitable fastener assembly. In the embodiment illustrated, the sensor body 12 includes a plurality of apertures 15 (FIG. 2) through which bolts or threaded rods can extend therethrough so as to secure each of the clevis halves 16 and 18 (having similar aligned apertures) to opposite sides of the sensor body 12. In another embodiment, a bolt or threaded rod can extend through aligned bores 19, 21, and 23 (FIG. 1) in each of the clevis halves 16 and 18 and sensor body 12. A nut (not shown) can be provided on one end of the rod and a super nut can be threaded upon an opposite end. A plurality of set screws extends though apertures in the super nut to engage in end of one of the clevis halves 16 or 18. This fastening technique is described in U.S. Pat. No. 7,788,984, which is incorporated herein by reference in its entirety.

Figure 3:
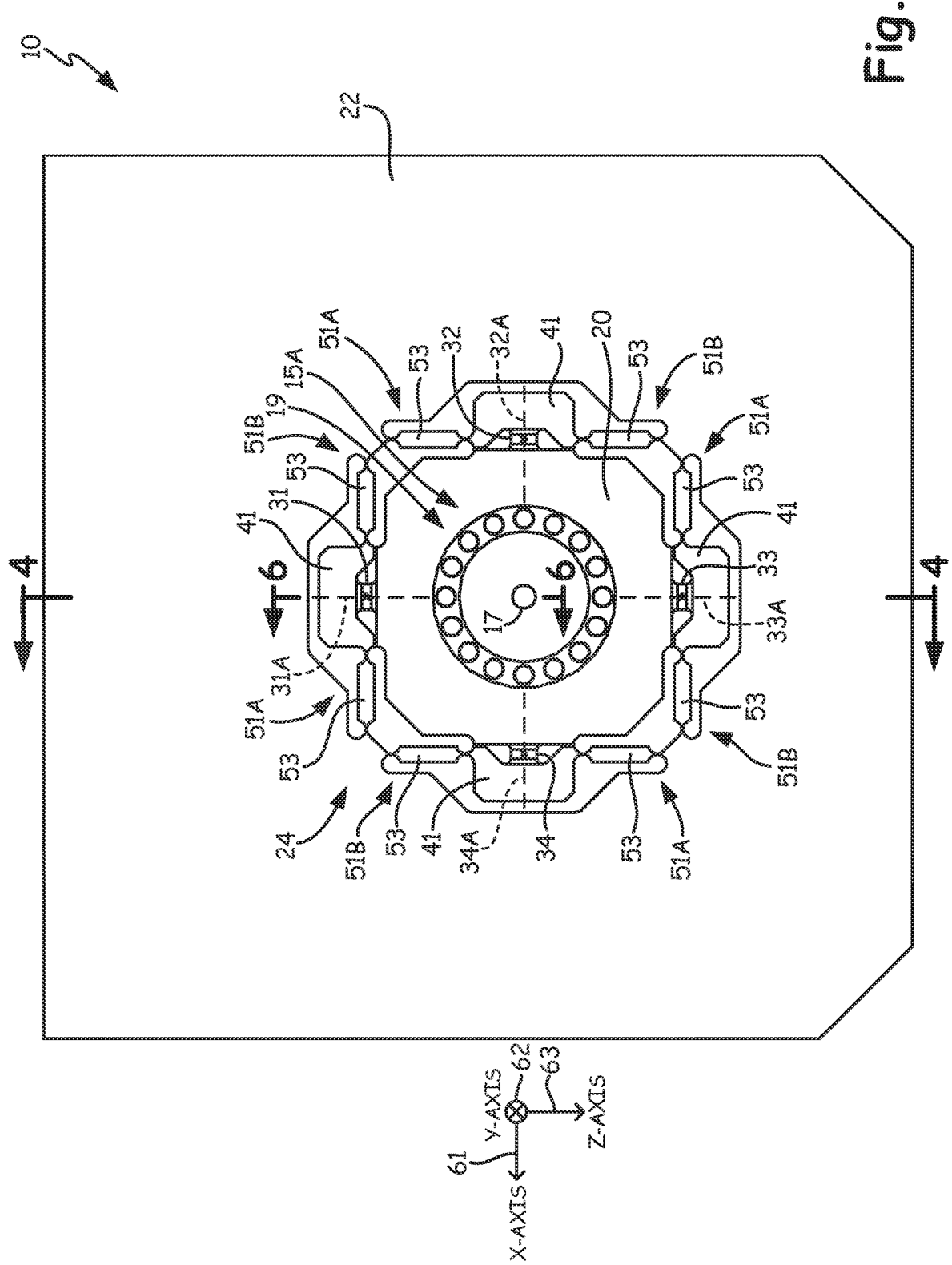
FIG. 3 is a front elevation view of the sensor body of FIG. 2.
Figure 4:
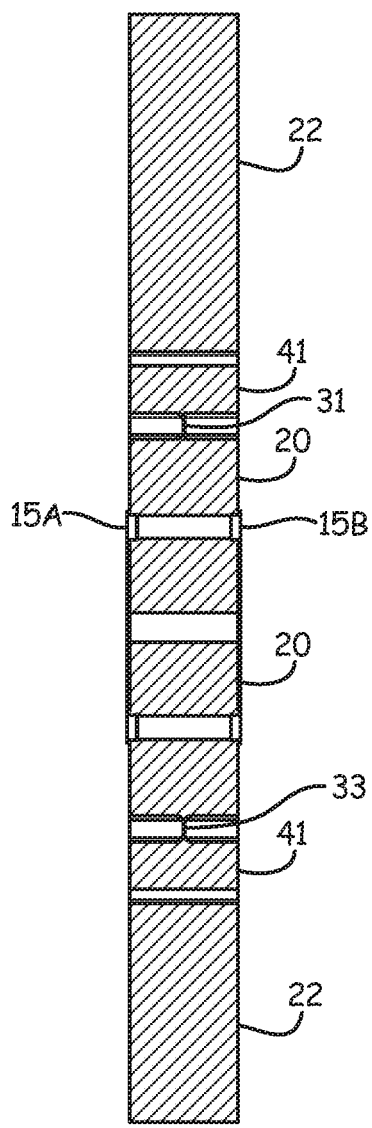
FIG. 4 is a view of the sensor body taken along lines 4-4 of FIG. 3.

It should be noted that although portions of the clevis 16 and 18 will engage or contact a center portion of the sensor body 12, gaps are provided between each of the clevis halves 16 and 18 and the sensor body 12 so as to allow portions of the sensor body 12 to move relative to the clevis halves 16 and 18. In the embodiment illustrated, projecting center portions 15A and 15B provided on each side of the sensor body 12 ensure contact of the clevis halves 16, 18 only with the center portions 15A and 15B (FIGS. 3 and 4), thereby maintaining the gaps as described above.

Referring to FIGS. 2-6, the sensor body 12 is preferably integral, being formed of a signal unitary block of material. The sensor body 12 includes a rigid central hub 20 upon which the surfaces 15A and 15B reside, and a rigid perimeter body 22 that is concentric with or disposed about central hub 20. A plurality of flexure structures 24 join the central hub 20 to the perimeter body 22. In the embodiment illustrated, the plurality of flexure structures 24 comprise four components 31, 32, 33 and 34. Each of the components 31-34 extend radially from the central hub 20 along corresponding longitudinal axis 31A, 32A, 33A and 34A. Preferably, axis 31A is aligned with axis 33A, while axis 32A is aligned with axis 34A. In addition, axes 31A and 33A are perpendicular to axes 32A and 34A. Although illustrated wherein the plurality of flexure components equals four, it should be understood that any number of components three or more can be used to join the central hub 20 to perimeter body 22. Preferably, the flexure components 31-34 are spaced at equal angular intervals about a central axis indicated at 35.

Referring to flexure component 31 by way of example, an intermediate member 41 is integral with, being formed from the unitary block of material, or otherwise connected to flexure component 31 at an end opposite central hub 20. Intermediate member 41 is preferably symmetric with respect to flexure component 31 or longitudinal axis 31A having side portions 41A and 41B on opposite sides of flexure component 31 or longitudinal axis 31A. Each side portion 41A, 41B is connected to perimeter body 22 through a flexure assembly 51A, 51B, respectively. Referring to flexure assembly 51A by way of example, each of the flexure assemblies 51A and 51B, in the embodiment illustrated, include a rigid connecting member 55. The connecting member 53 is connected or joined to one of the side portions 41A, 41B through a thin flexible web 55. At an end opposite the intermediate member 41, the connecting member 55 is connected to perimeter body 22 through a thin web 57. It should be noted that the webs 55 and 57 are relatively wide being, for example, similar to the width or thickness of the perimeter body 22; however, each of the webs 55 and 57 are thin in a direction normal to the width of the perimeter body 22. The orientation of each of the webs 55 and 57 connecting the intermediate member 41 to the perimeter body 22 are oriented perpendicular to the flexure component associated with each intermediate number 41. In other words, each of the connecting webs 55 and 57 are relatively wide in a direction parallel to the central axis 35, but thin in a cross-section perpendicular to axis 35. In contrast, each of the flexure components 31-34 are thin in a direction parallel to the central axis 35 and relatively wide in a cross-section perpendicular to the axis 35. Given this construction, the connecting webs 55 and 57 are compliant for forces along the longitudinal axis of the flexure component to which it is connected, but stiff for an axis orthogonal to the axis of the flexure component to which it is associated with, and the axis orthogonal to the foregoing axes (or the axis parallel to the central axis 35).

In the exemplary embodiment comprising four orthogonal flexure components 31-34, the flexure components 31-34 operate in pairs for forces along an axis that is orthogonal to the longitudinal axes of each pair of flexure components (31,33 and 32,34) and orthogonal to the central axis 35. In particular, flexure components 31 and 33 transfer forces between the central body 20 and the perimeter body 22 for forces along an axis 61 (wherein connecting webs 55 and 57 associated flexure components 32 and 34 are compliant in this direction), while flexure components 32 and 34 transfer forces between the central body 20 and the perimeter body 22 for forces along an axis 63 (wherein connecting webs 55 and 57 associated flexure components 31 and 33 are compliant in this direction).

It should be noted that the flexure assemblies 51A and 51B (herein by example connecting member 53 and connecting webs 55, 57) associated with each flexure component 31-34 (on opposite sides of the flexure component) are disposed so as to coincide at least approximately with a midpoint along the length of the corresponding flexure component. Referring to the enlarged view of FIG. 5 a midpoint of the longitudinal length of the flexure component 31 is indicated at 66. The flexure assemblies 51A, 51B on opposite sides of the flexure component 31 (herein comprising connecting webs 55 and 57), are orthogonal to the associated flexure component in a planar sense, but are configured or disposed so as to be approximately inline with the midpoint 66 as represented by dashed line 68, or substantially proximate to the midpoint 66. In other words the web(s) of the flexure assemblies 51A, 51B on each side of the flexure component they are associated with can be defined by corresponding planes, the planes of which are orthogonal to a plane representing the flexure component. Orientation of the connecting web(s) of the flexure assemblies 51A, 51B relative to the associated flexure component at the midpoint 66 causes forces to be transferred through the center of the length of the flexure component which allows the component to be very stiff with most deflection due to strain deflection and not bending. Since the flexure component is very stiff it has a good frequency response with excellent resolution. Since each of the flexure components 31-34 and associated flexure assemblies 51A, 51B are connected in the manner described above about center axis 35, the sensor body 12 includes flexure elements (flexure components 31-34) that can be used to sense forces with respect to two orthogonal axes 61, 63 that can carry high loads with high resolution.

In one embodiment, each flexure assembly is configured such that forces transferred between central hub 20 and the peripheral member 22 cause a first force at the connection of the flexure component to the central hub 20 to be equal and opposite to a second force at the connection of the flexure component to the peripheral member 22, wherein the first and second force are tangential to the radial direction of each corresponding flexure component.

It should be noted one aspect of the invention is use of the flexure assemblies being configured such that on each side of the flexure component they are connected to provide compliance in a direction of the longitudinal length of the flexure component from the hub to the outer perimeter. The flexible elements of the flexure assemblies are defined by aligned corresponding planes, the planes of which are orthogonal to the direction of compliance and coincide at least approximately with a midpoint along the length of the corresponding flexure component. Although various embodiments of flexure components such as components 31-34 have and will be described, these specific structures should not be considered the only components that can be used, but rather other flexure components can be used.

Figure 5:
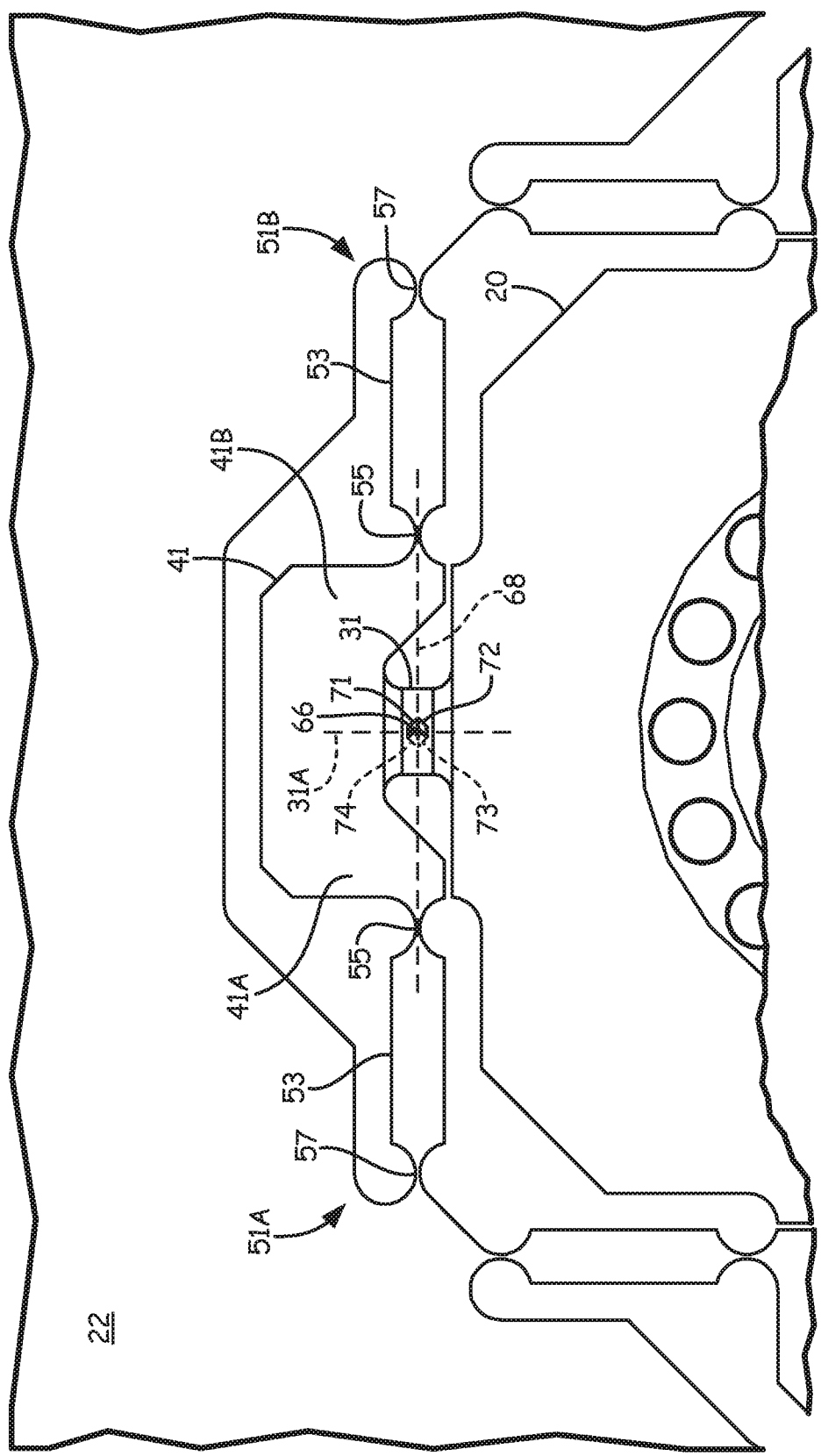
FIG. 5 is a close-up view of a portion of the sensor body of FIG. 3.
Figure 6:
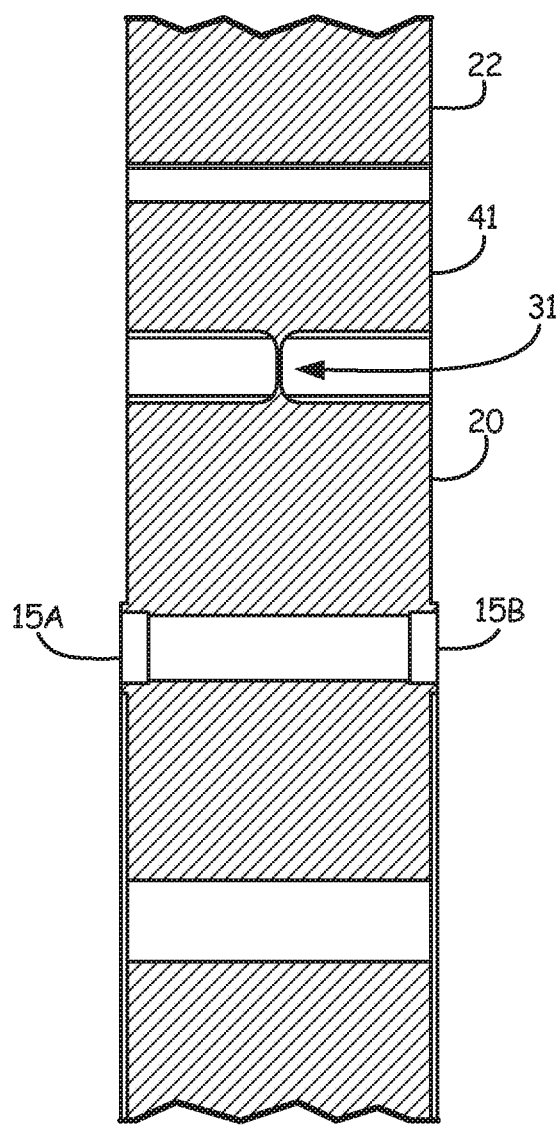
FIG. 6 is a close-up view of a portion of the cut away view of FIG. 4.
Figure 7:
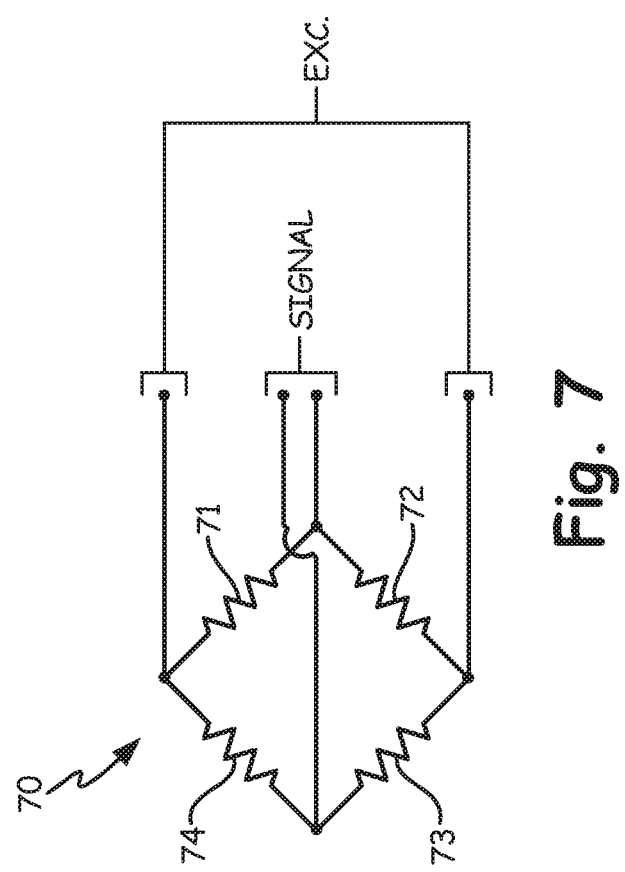
FIG. 7 is a circuit diagram of a Wheatstone bridge for the sensor elements of FIG. 2.

In one embodiment each of the flexure components 31-34 includes sensor elements to measure shear deflection or strain therein. The sensing elements can take any number of forms known to those skilled in the art, including electrically and optically based sensor elements to name just a few. In the embodiment illustrated, strain gauges are connected in a Wheatstone bridge with strain gauge elements placed on both sides of the flexure component on the principle stress axis. Referring to the enlarged view of FIG. 5 and the circuit diagram of FIG. 7, the Wheatstone bridge 70 includes sensor elements 71 and 72, on one side of the flexure component, while on a side opposite of the flexure component that is shown in FIG. 5, sensor elements and 73 and 74 (shown with dashed lines) are affixed to the flexure component.

Figure 8:
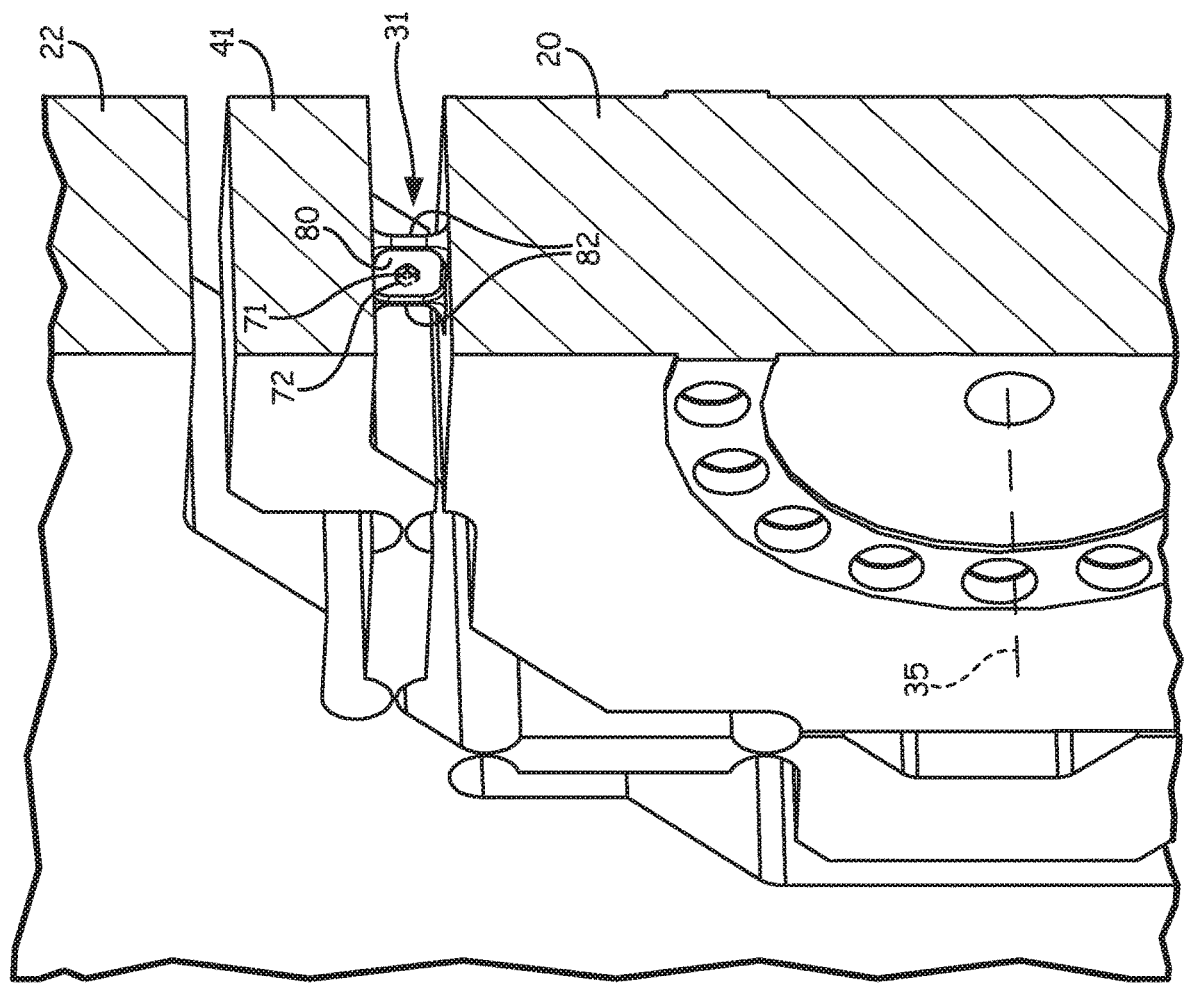
FIG. 8 is a close up view of a portion of the sensor body of FIG. 2.

It should be noted in the embodiment illustrated, each of the flexure components 31-34 are relatively thin in a direction parallel to central axis 35. However, it should be noted, that the component is not thin in this direction in order to necessarily provide compliance but rather, the thickness of the flexure components are minimized in order to obtain a high output signal (maximize deflection) and a higher signal to noise ratio. In yet an alternative embodiment illustrated in FIG. 8, the flexure component 31 includes a sensing portion 80 upon where the sensor elements 71 and 72 are disposed (sensor elements 73 and 74 being on the opposite side of sensing portion 80) and portions 82A and 82B that are on opposite sides of sensor portion 80 and are of greater thickness in order to provide greater stiffness in the direction parallel to the central axis 35, while still maintaining required sensitivity in the axis of measurement.

Another sensor body is indicated at 102 at FIGS. 9-13, which can be used in place of the sensor body 12, described above, in one exemplary embodiment. The sensor body 102 has elements similar in function to that described above with respect to sensor body 12 and has such similar components are identified with the same reference numbers. As illustrated, the sensor body 102 includes flexure components 31 and 33, intermediate members 41, connecting members 53 and connecting webs 55-57. The flexure components 31 and 33 measure forces between the central body 20 and the perimeter body 22 for forces in a direction parallel to axis 61. Sensor body 102 however includes flexure structures 102 and 104 to transfer forces between the central body 20 and the perimeter body 22 along axis 63. The flexure structures 103 and 104 are designed to be substantially stiffer then the flexure components 31 and 33 so as to transfer substantially larger forces between the central body 20 and the perimeter body 22.

Referring to flexure structure 103 by way of example, each of the flexure structures 103 and 104 include two flexure components 112A and 112B extending from the central body 20 to an intermediate member 111. As illustrated, the flexure components 112A, 112B each have a longitudinal axis indicated at 113A and 113B wherein an acute angle 116 is formed between the axes 113A, 113B. In the embodiment illustrated, the flexure components 112A, 112B are oriented so as to converge in a direction toward the intermediate member 111; however, in an alternative embodiment, if desired, an acute angle can be formed between the flexure components with convergence toward the central body 20 rather than the intermediate member 111.

The intermediate member 111 is connected to the perimeter body 22 with flexure assemblies 115A and 115B (herein by example each comprising a connecting web 117) on opposite sides of the intermediate member 111. The flexure assemblies 115A and 115B are substantially stiff for forces along axis 63, but significantly more compliant for forces along axis 61 such that these forces are transferred between the central body 20 and the perimeter body 22 through the flexure components 31 and 33.

Figure 9:
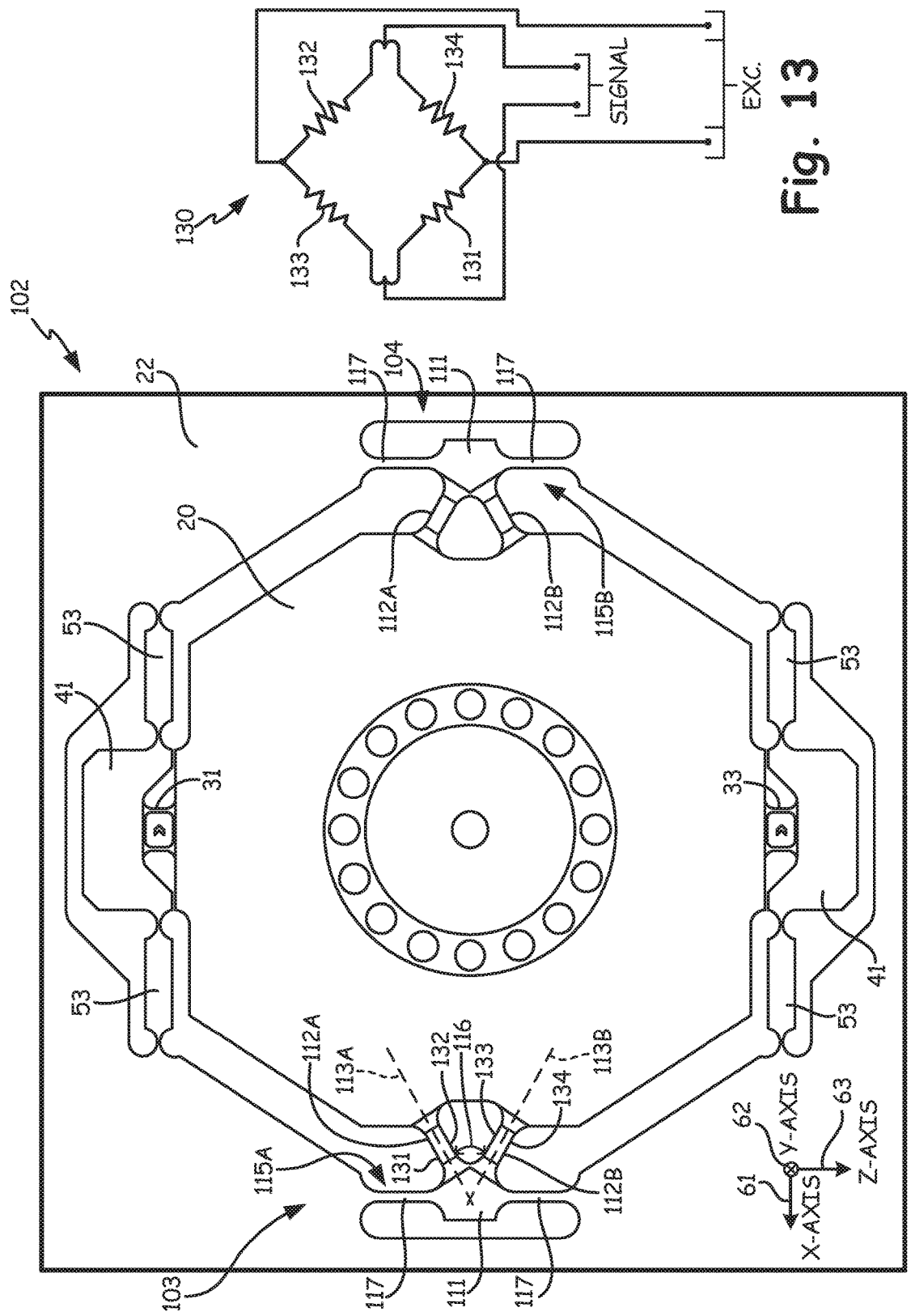
FIG. 9 is a front elevation view of a sensor body according to another embodiment of the present disclosure.
Figure 10:
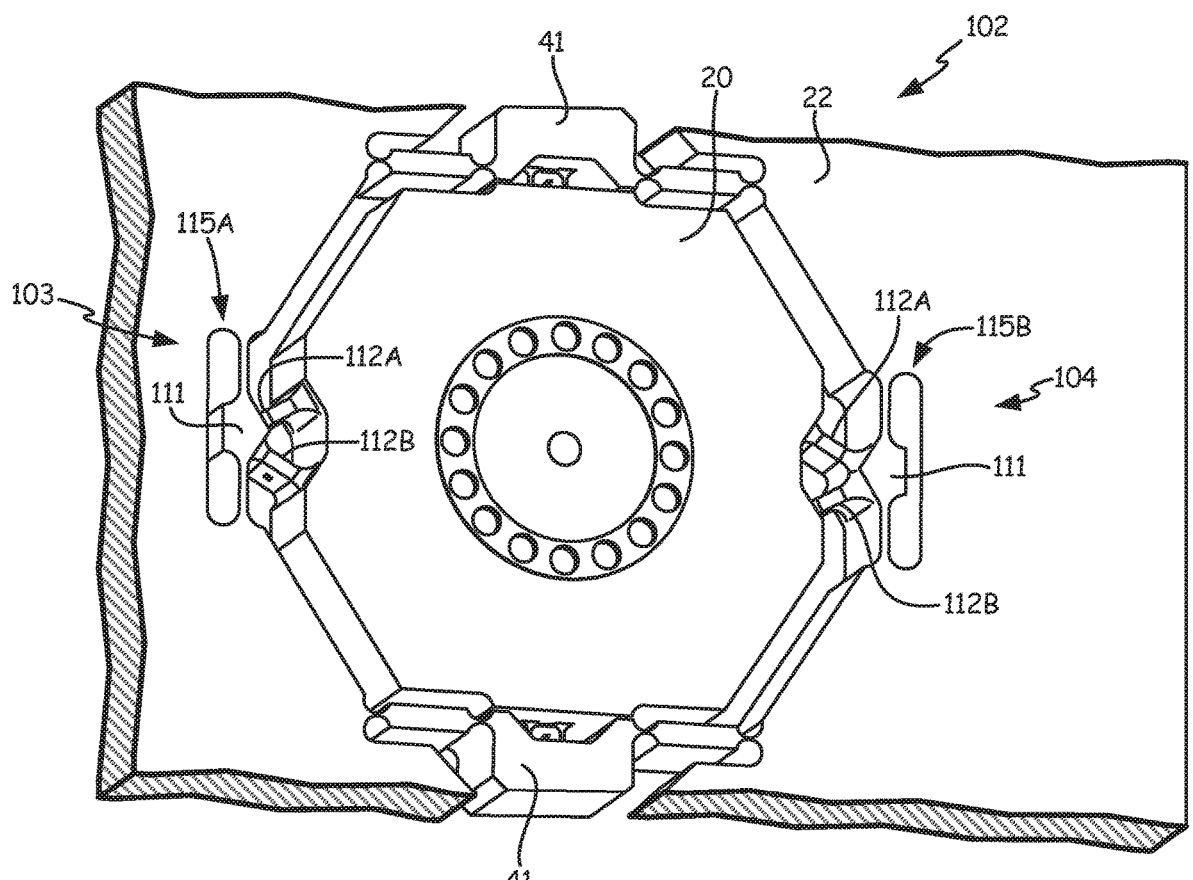
FIG. 10 is a perspective view of the sensor body of FIG. 9.
Figure 11:
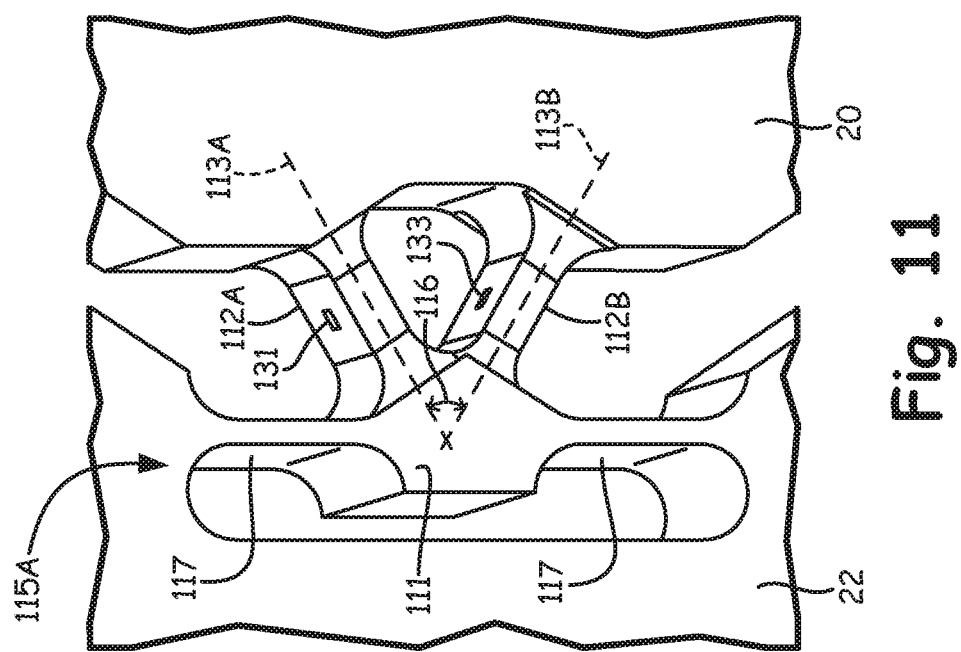
FIG. 11 is a close up view of a portion of the sensor body of FIG. 10.
Figure 12:
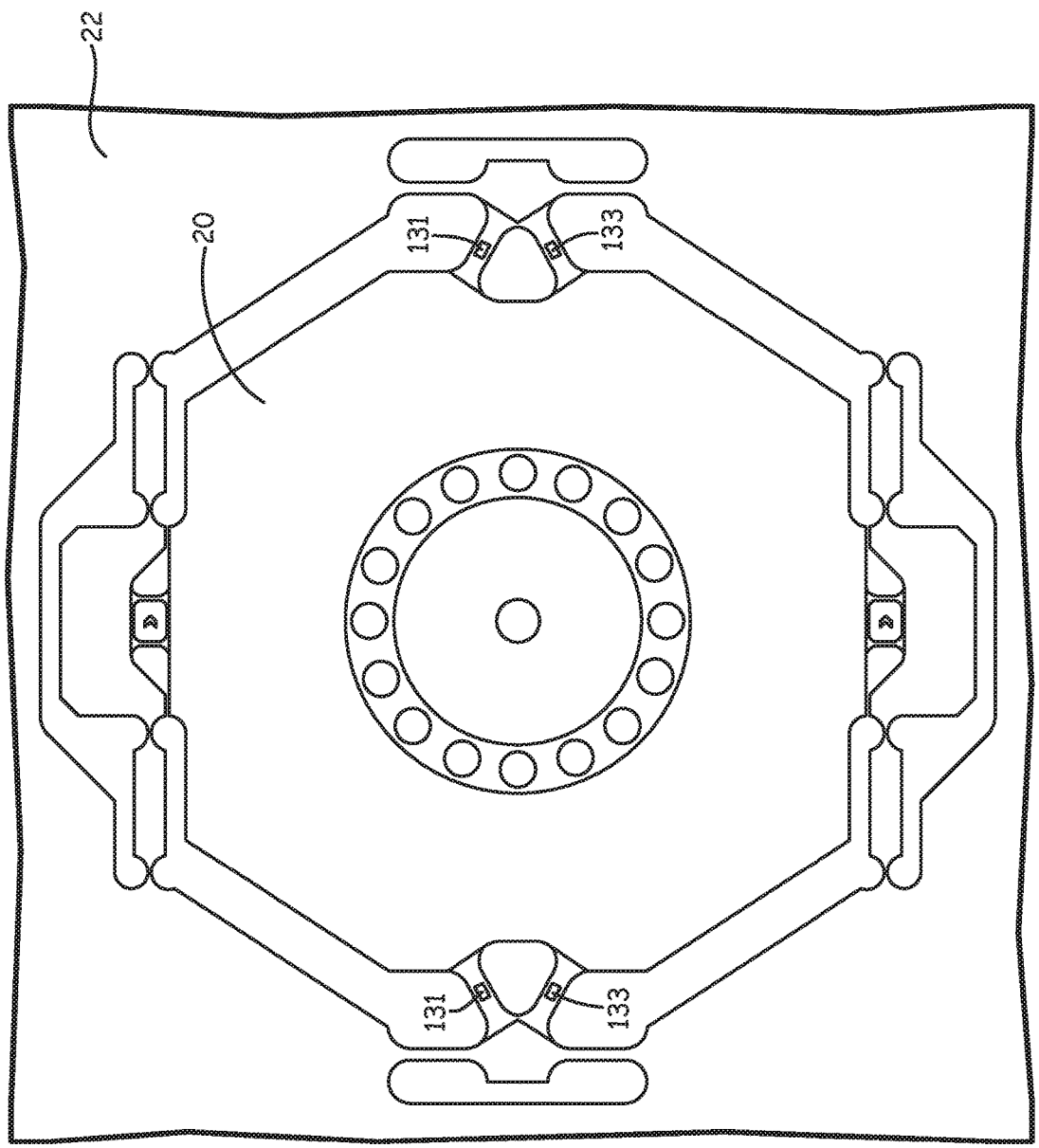
FIG. 12 is a front elevation view showing locations of sensor elements on the sensor body of FIG. 9.

In one embodiment each of the pairs of the flexure components 112A, 112B for flexure structures 103 and 104 includes sensor elements to measure component deflection or strain therein. The sensor elements can take any number of forms known to those skilled in the art, including electrically and optically based sensor elements to name just a few. In the embodiment illustrated, strain gauges are connected in a Wheatstone bridge with strain gauge elements placed on opposite sides of each flexure components 112A, 112B. Referring to FIG. 9 and the circuit diagram of FIG. 13, a Wheatstone bridge 130 includes sensor elements 131 and 132 on opposite sides of flexure component 112A, while sensor elements 133 and 134 are on opposite sides of flexure component 112B. FIG. 12 illustrates location of the sensor elements 131 and 133 on the sides of each of the flexure components 112A and 112B (i.e. parallel to the sides of the sensor body 102, rather than between the sides of the sensor body 102).

Figure 14:
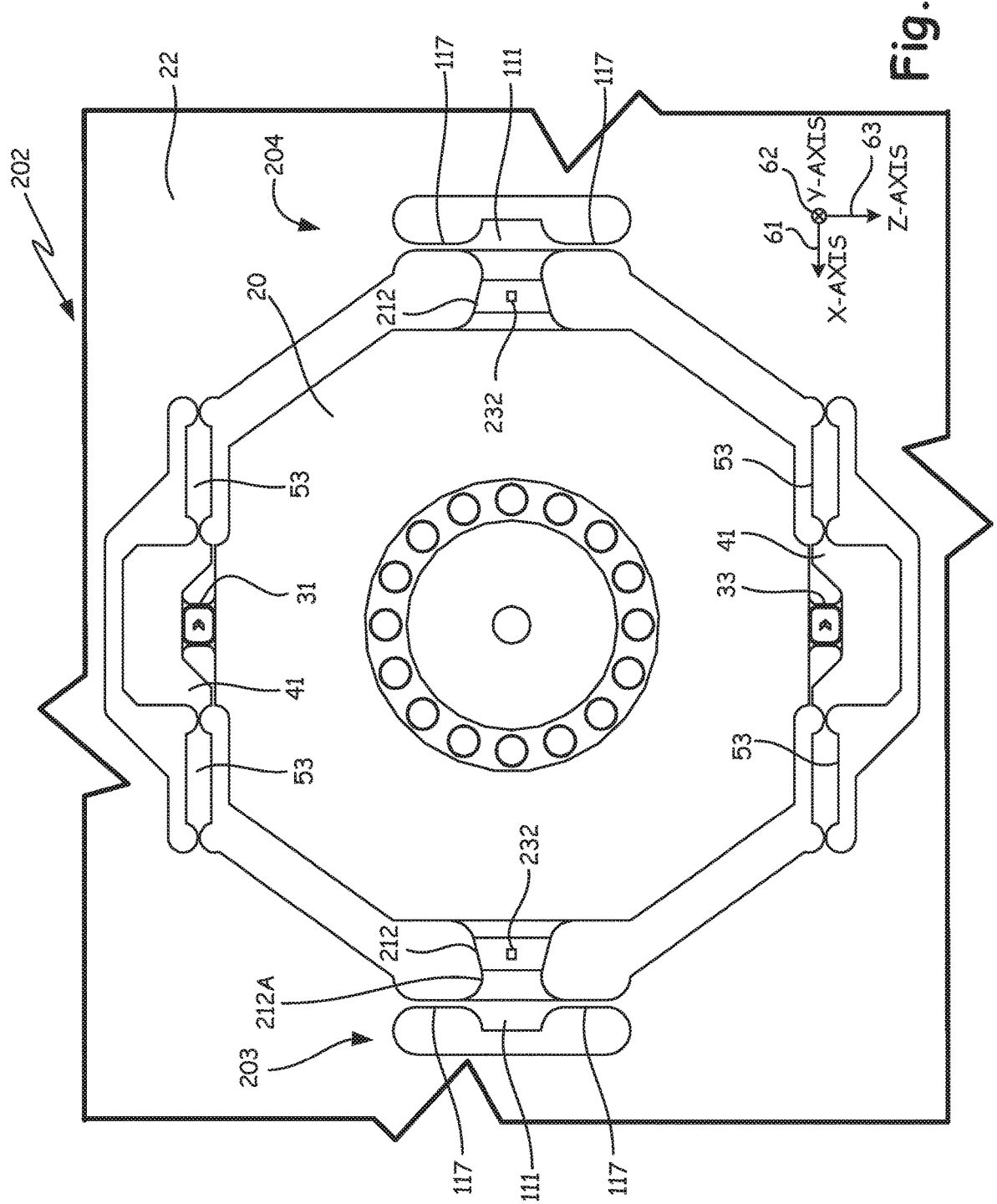
FIG. 14 is a front elevation view of a sensor body according to another embodiment of the present disclosure.
Figure 15:
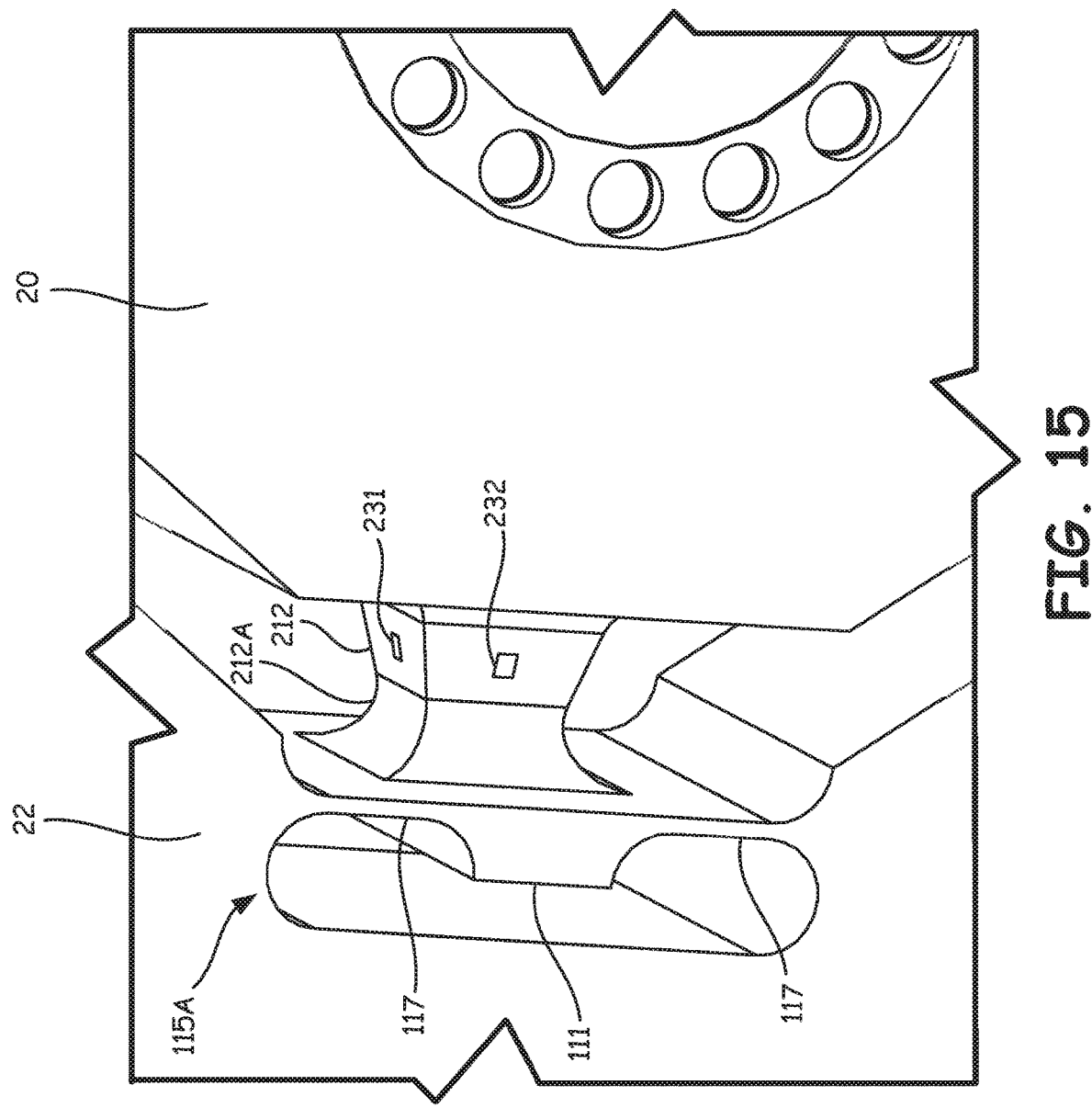
FIG. 15 is a close up view of a flexure element of the sensor body of the FIG. 14.
Figure 16:
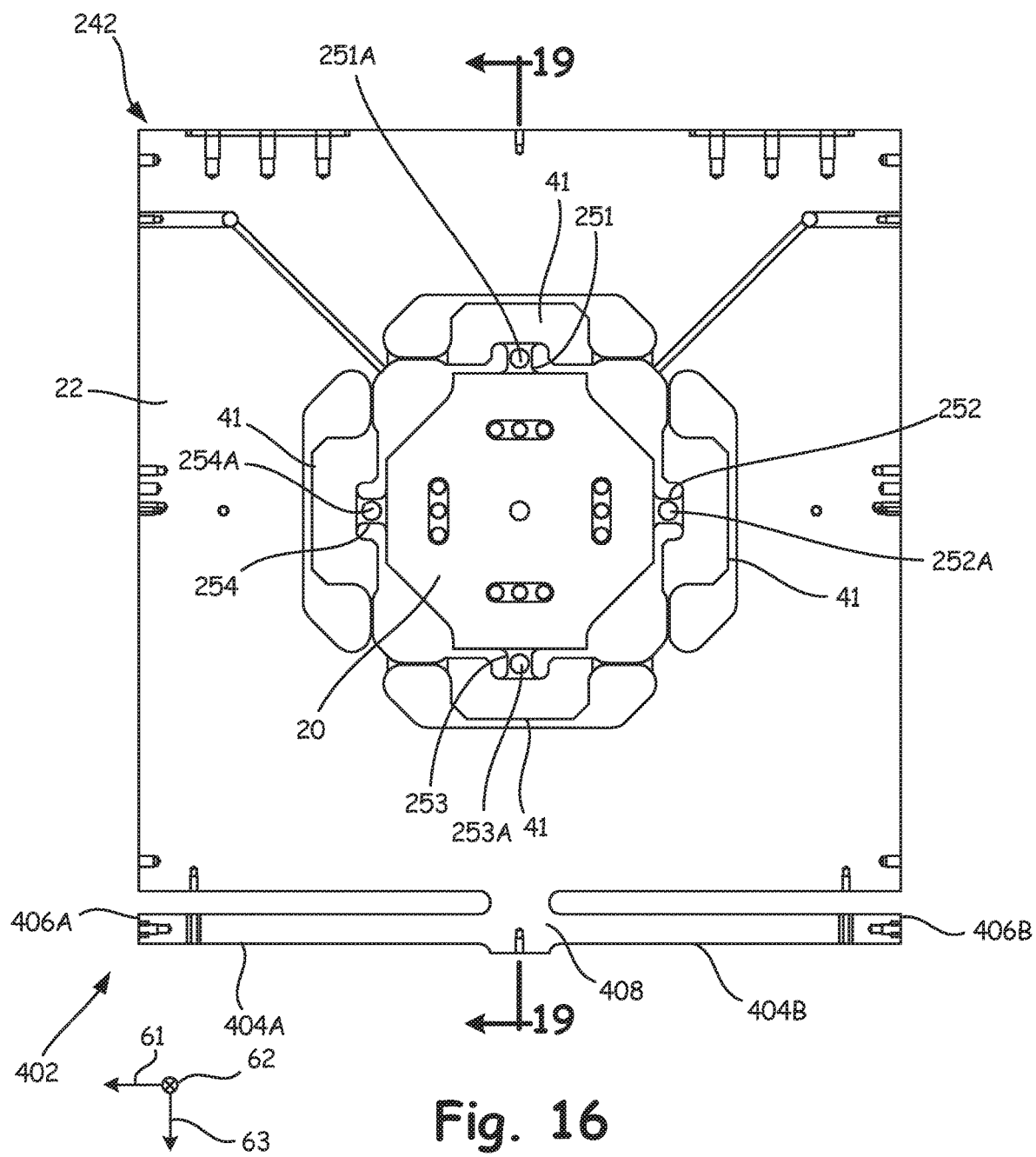
FIG. 16 is a front elevation view of yet another sensor body according to another embodiment of the present disclosure.
Figure 17:
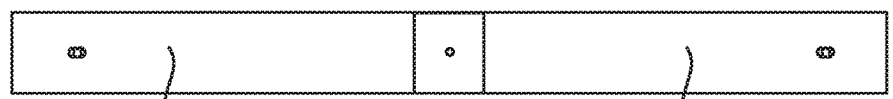
FIG. 17 is a bottom view of the sensor body of FIG. 16.

Another sensor body is indicated at 202 at FIGS. 14-15, which can be used in place of the sensor body 12, described above, in one exemplary embodiment. The sensor body 202 has elements similar in function to that described above with respect to sensor body 12 and sensor body 102 and as such similar elements are identified with the same reference numbers. As illustrated, the sensor body 202 includes flexure components 31 and 33, intermediate members 41, connecting members 53 and connecting webs 55-57. The flexure components 31 and 33 measure forces between the central body 20 and the perimeter body 22 for forces in a direction parallel to axis 61. Sensor body 202 however includes flexure structures 203 and 204 to transfer forces between the central body 20 and the perimeter body 22 along axis 63. The flexure structures 203 and 204 are designed to be substantially stiffer then the flexure components 31 and 33 so as to transfer substantially larger forces between the central body 20 and the perimeter body 22.

Each of the flexure structures 203 and 204 include a flexure component 212 that is rectangular (preferably square) in cross-section along the length thereof, but at least two sides, preferably opposite to each other, are tapered along the length of the flexure component 212 such that one end portion of the flexure component 212 is smaller in cross-section than the other end portion, herein end portion 212A connected to intermediate member 111 is smaller in cross-section (before connection to intermediate member 111). In the illustrated embodiment all sides are tapered along the length of the flexure component 212, i.e. being frusto-pyramidal in a center section. This construction allows the strain field in the center of the flexure component 212 to be approximately 80% (although this value is adjustable based on the shape of the flexure component 212) of the strain in the connecting fillets at the ends of the flexure component 212. Each of the sides of the flexure component 212 can include a sensor element such as those described above connected in a conventional Wheatstone bridge (not shown). Strain gauges 231 and 232 are illustrated by way of example.

Yet another sensor body is indicated at 242 at FIGS. 16-21, which can be used in place of the sensor body 12, described above, in one exemplary embodiment. The sensor body 242 has elements similar in broad function to that described above with respect to sensor body 12 and as such similar elements are identified with the same reference numbers. As illustrated, the sensor body 242 includes flexure components 251 and 253, intermediate members 41, connecting members 53 and connecting webs 55-57. The flexure components 251 and 253 measure forces between the central body 20 and the perimeter body 22 for forces in a direction parallel to axis 61. In this embodiment, flexure components 252 and 254, intermediate members 41, connecting members 53 and connecting webs 55-57 measure forces between the central body 20 and the perimeter body 22 for forces in a direction parallel to axis 63 and are also substantially the same as the flexure structures for measuring forces in a direction parallel to axis 61. However, this is not a requirement as demonstrated by the previous embodiments. Hence, any of the other flexure structures can be used, typically in pairs, but otherwise without limitation, of any of the previous embodiments for either measuring forces in a direction parallel to axis 61 or to axis 63.

In the embodiment of FIGS. 16-21, the flexure components 251-254 are very similar to flexure components 31-34; however, flexure components 251-254 include corresponding apertures 251A, 252A, 253A and 254A. The strain gauges on the flexure components 251-254 are configured to measure strain in bending (as parallel double cantilever bending beams 255A and 255B illustrated in FIG. 20) rather than to measure strain in shear as flexure components 31-34 operate. Each of the flexure components 251-254 includes sensor elements to measure bending deflection or strain therein. The sensing elements can take any number of forms known to those skilled in the art, including electrically and optically based sensor elements to name just a few. For instance, resistive strain gauges connected in a suitable Wheatstone bridge can be secured to each of the beams 255A and 255B of each flexure component 251-254. In one embodiment, the strain gauges are secured to the inwardly facing surface 254B of each beam 255A, 255B formed by each aperture 251A-254A, although the strain gauges could also be secured to the outwardly facing surfaces 254C, which face in opposite directions. Like the flexure components 31-34, the sensing gauges for sensing deflection of each of the beams 255A and 255B are located approximately at the midpoint of each beam 255A, 255B of each flexure component 251-254 and where the flexible elements (connecting members 53 and connecting webs 55-57) of the flexure assemblies are defined by aligned corresponding planes, the planes of which are orthogonal to the direction of compliance and coincide at least approximately with a midpoint along the length of each beam 255A, 255B of the corresponding flexure component 251-254, or stated another way bisect each of the apertures 251A-254A. The structure of the flexure components 251-254 provides high stiffness with very good resolution and low cross-talk. Although apertures 251-254 are illustrated as round holes, it should be understood that the apertures could be of any suitable shape, such as but not limited to square apertures with rounded corners, or the like, without departing from the scope of the disclosure.

Figure 22:
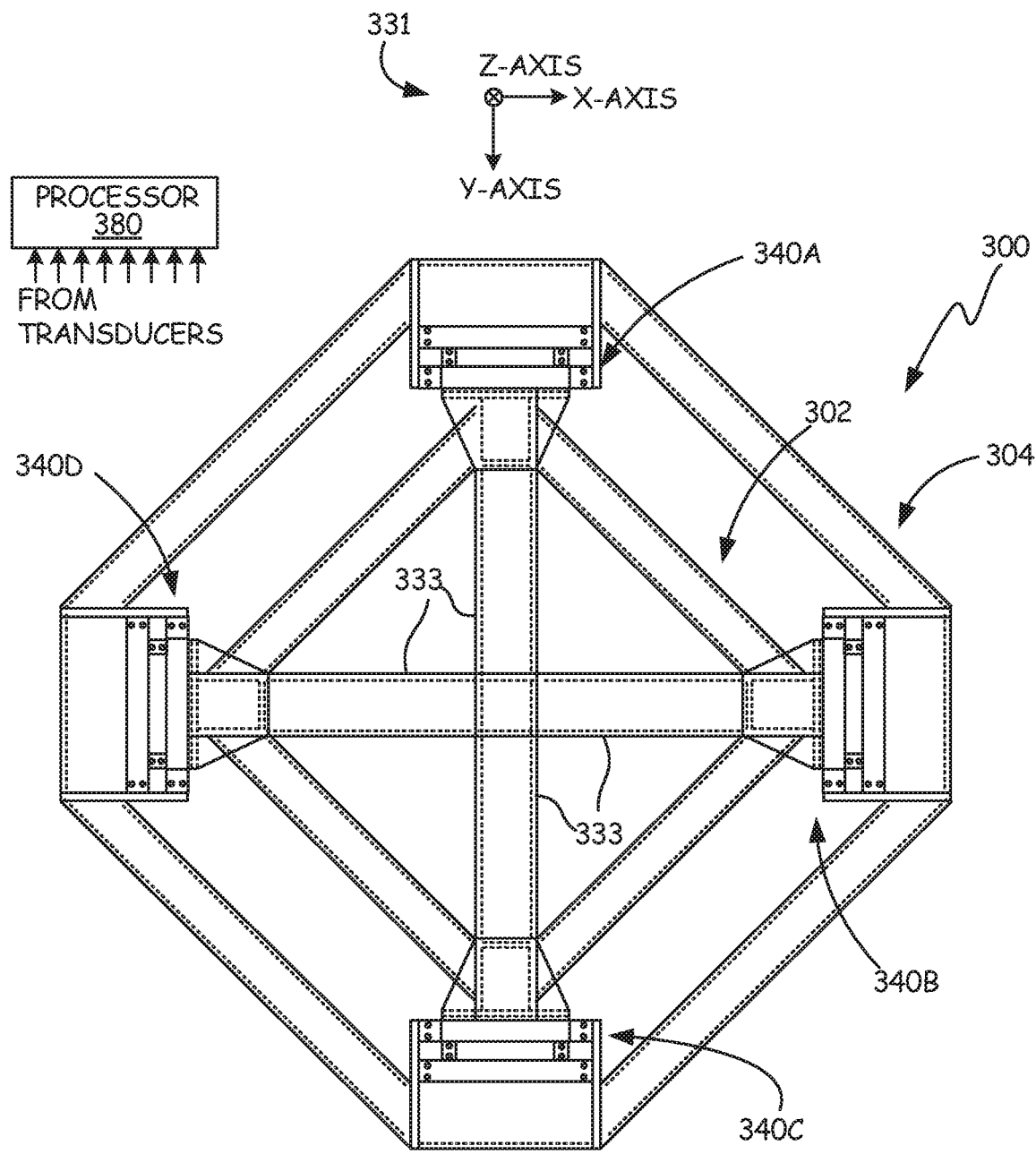
FIG. 22 is a top view of a platform balance according to an embodiment of the present disclosure.
Figure 23:
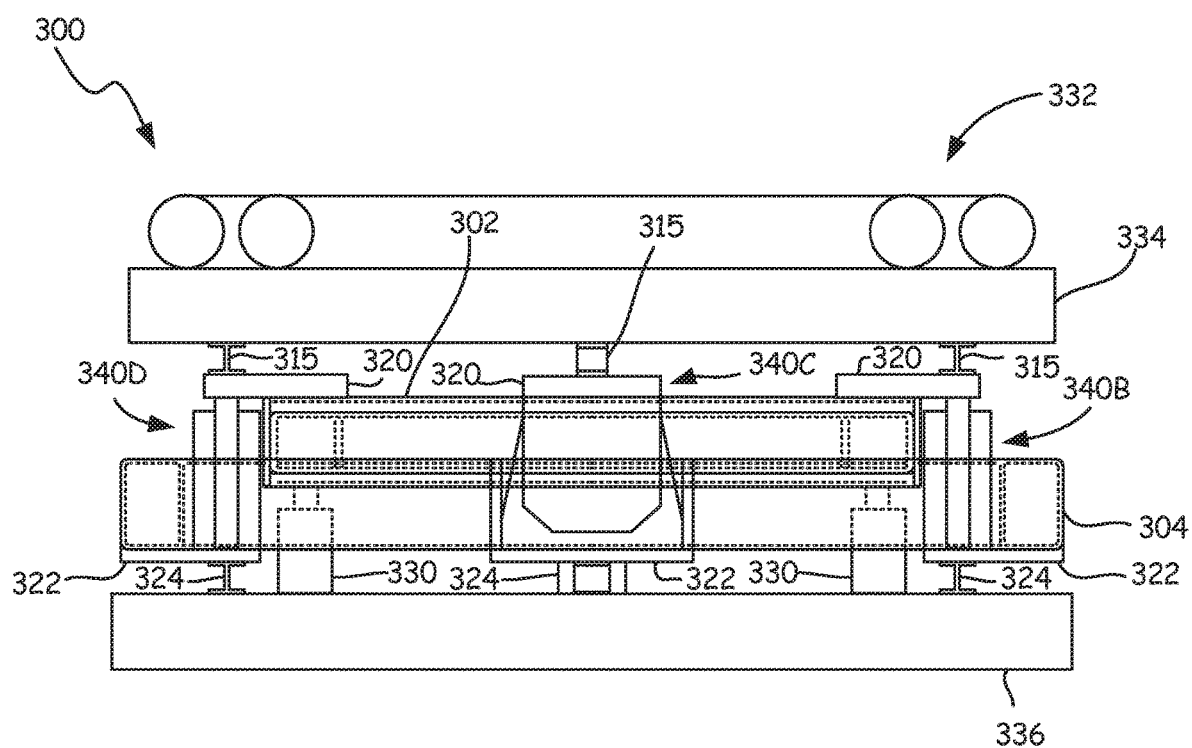
FIG. 23 is a side elevation view of the platform balance of FIG. 22.

An exemplary embodiment of any of the foregoing transducer bodies with suitable sensing elements to form a transducer assembly can be incorporated in a platform balance 300 an example of which is illustrated in FIGS. 22-23. In the embodiment illustrated, the platform balance 300 can include a first frame support 302 and a second frame support 304. A plurality of transducer assemblies 340A-D, herein four although any number three or more can be used, couple the first frame support 302 to the second frame support 304. The platform balance 300 can be used to measure forces and moments applied to a test specimen of nominally large weight or mass such as a vehicle, plane, etc. or models thereof. The frame supports 302 and 304 are nominally unstressed reaction frames, wherein each of the transducers comprises a two-axis force transducer as described above. Various levels of flexure isolation can be provided in the platform balance 300 to provide increased sensitivity, while nominally supporting large masses.

The platform balance 300 is particularly well suited for measuring force and/or moments upon a large specimen such as a vehicle in an environment such as a wind tunnel. In this or similar applications, the platform balance 300 can include flexures 315 isolating the frame support 302 and 304 from the test specimen and a ground support mechanism. In the embodiment illustrated, four flexures 315 are provided between each of the transducer assemblies, being coupled to the plates 320. Similarly, four flexures 324 are coupled to the mounting plates 322. The flexures 315, 324 thereby isolate the frame supports 302 and 304. The flexures 315, 324 are generally aligned with the sensor bodies of each corresponding transducer assembly.

The platform balance 300 is particularly well suited for use in measuring forces upon a vehicle or other large test specimen in a wind tunnel. In such an application, rolling roadway belts 332 are supported by an intermediate frame 334 coupled to the flexure members 315. The rolling roadway belts 332 support the vehicle tires. In some embodiments, a single roadway belt is used for all tires of the vehicle. The platform balance 300 and rolling roadway belt assemblies 332 are positioned in a pit and mounted to a turntable mechanism 336 so as to allow the test specimen, for example a vehicle, to be selectively turned with respect to the wind of the wind tunnel.

Each of the frame supports 302 and 304 comprise continuous hollow box components formed in a perimeter so as to provide corresponding stiff assemblies. The frame support 302 holds the sensor bodies in position with respect to each other, while the frame support 304 holds the clevis assemblies in position with respect to each other. Stiffening box frame members 333 can also be provided in the support frame as illustrated.

As appreciated by those skilled in the art, outputs from each of the two-axis sensing circuits from each of the transducer assemblies can be combined so as to sense or provide outputs indicative of forces and moments upon the platform balance in six degrees of freedom. A coordinate system for platform 300 is illustrated at 331. Output signals from transducer assemblies 340A and 340C are used to measure forces along the X-axis, because transducer assemblies 340B and 340D are compliant in this direction. Likewise, output signals from transducer assemblies 340B and 340D are used to measure forces along the Y-axis, because transducer assemblies 340A and 340C are compliant in this direction. Outputs from all of the transducers 340A-340D are used to measure forces along the Z-axis. The flexure components 251-254 are relatively stiff or rigid for lateral loads, that being in a direction parallel to axis 62. Overturning moments about the X-axis are measured from the output signals from transducers 340A and 340C; while overturning moments about the Y-axis are measured from the output signals from transducers 340B and 340D; and while overturning moments about the Z-axis are measured from the output signals from transducers 340A-340D. Processor 380 receives the output signals from the sensing circuits of the transducers to calculate forces and/or moments as desired, typically with respect to the orthogonal coordinate system 331.

If desired a counter balance system or assembly can be provided to support the nominal static mass of the test specimen, other components of the operating environment such as roadways, simulators and components of the platform balance itself. The counter balance system can take any one of numerous forms such as airbags, hydraulic or pneumatic devices, or cables with pulleys and counter weights. An important characteristic of the counter balance system is that it is very compliant so as not to interfere with the sensitivity or measurement of the forces by the transducer assemblies in order to measure all of the forces and moments upon the test specimen. In the embodiment illustrated, the counter balance system is schematically illustrated by actuators 330.

However, in a further aspect of the present invention, the counter balance system can be removed as explained below, which can be a very large cost savings. Referring back to FIGS. 16 and 18, the sensor body 242 includes a biasing structure 402 disposed on the sensor body 242 so as to develop a biasing offset force in a selected direction, herein by way of example along the axis 63 in the Z-direction. The biasing structure 402 comprises cantilevered beams 404A and 404B. In the embodiment illustrated, remote ends 406A and 406B extend in opposite directions where each of the beams 404A and 404B are mounted to the sensor body 242 by a base support 408. It should be noted that use of a single base support 408 is not necessary in that the cantilevered beams 404A and 404B can each have a separate base support secured to sensor body 242; however use of a single base support 408 is of a simpler construction. Likewise, although illustrated with the beams 404A and 404B extending in opposite directions alternative embodiments may have the beams extend toward each other. Finally, the biasing structure 402 need not be a cantilevered beam, but can be any structure that is configured to provide a biasing force for the purpose described below.

In the embodiment illustrated the biasing structure 402 can be formed integral with the sensor body 242 from a single unitary body; however, this should not be considered limiting in that individual components can be joined together and/or joined to the sensor body 242 to realize the same structure.

Figure 24:
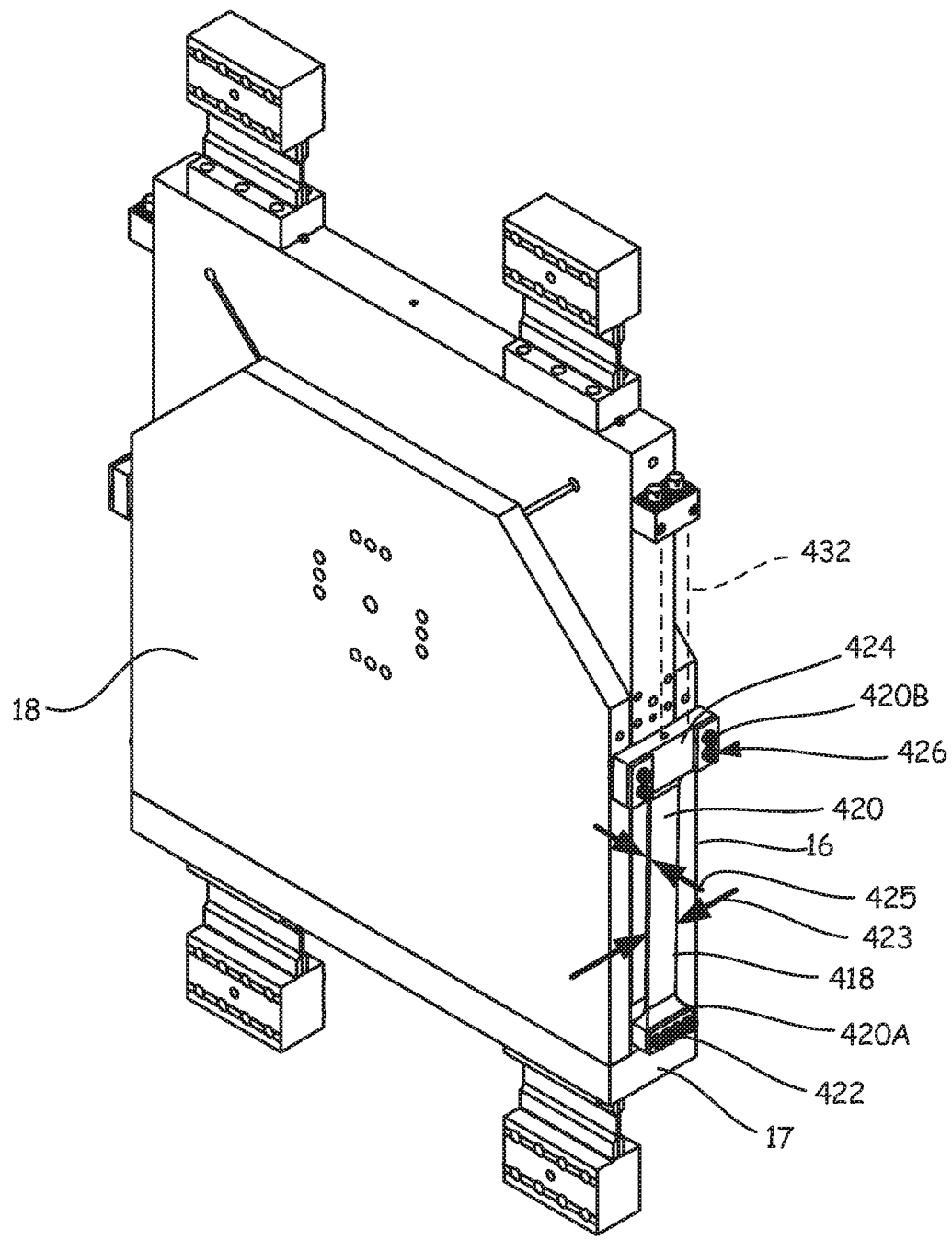
FIG. 24 is a perspective view of a transducer body according to another embodiment of the present disclosure.
Figure 25:
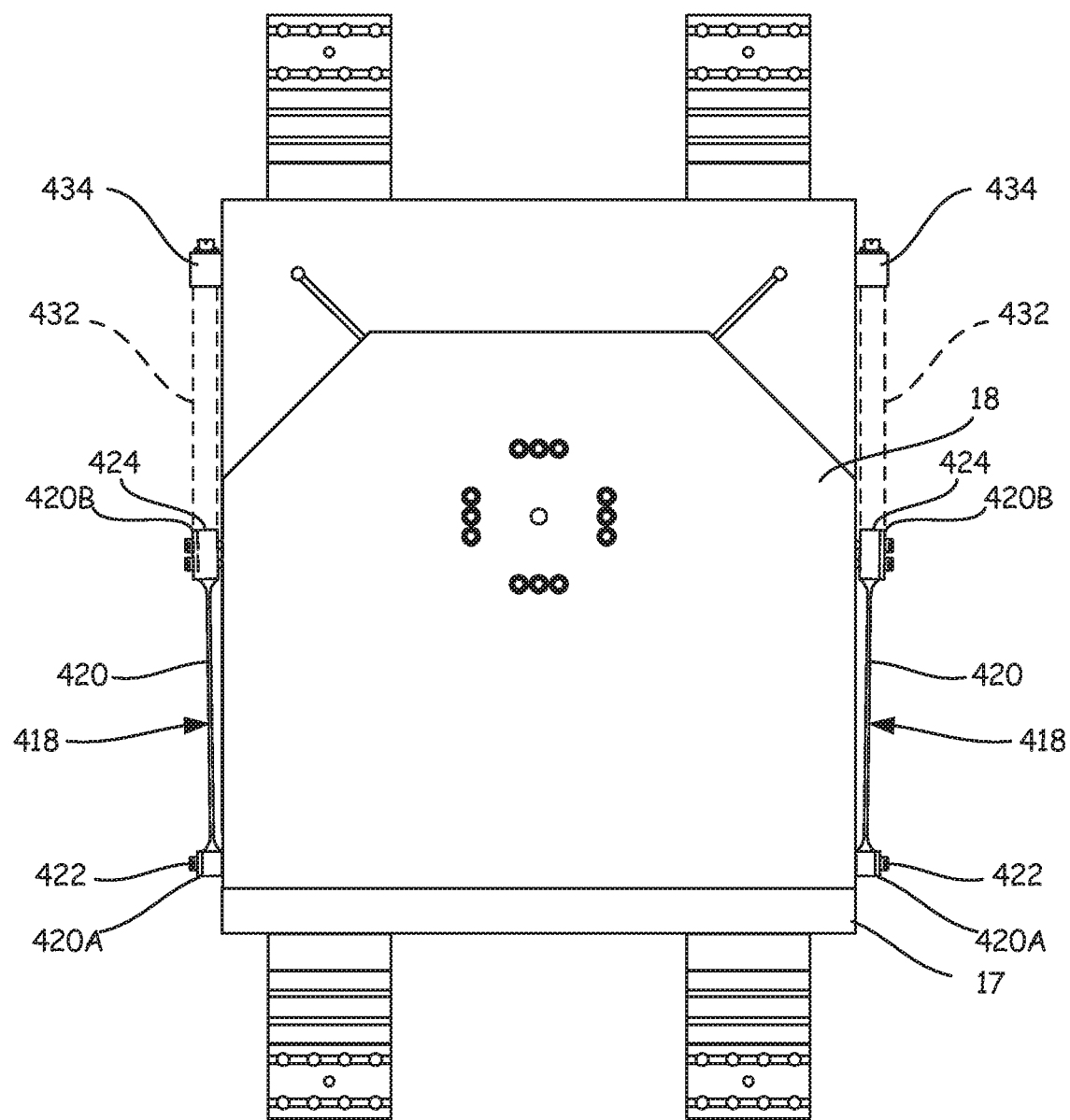
FIG. 25 is a front elevation view of the transducer body of FIG. 24.

Referring also to FIGS. 24 and 25, biasing retaining elements 418 connect the biasing structure 402 (located between the clevis halves 16 and 18) to the clevis halves 16 and 18. In the embodiment illustrated, the biasing retaining elements 418 operate in tension and herein comprise elongated connectors 420 each joined at a first end 420A to one of the remote ends 406A or 406B with a suitable fastener herein bolts 422. A second end 420B of the elongated connectors 420 is joined to both of the clevis halves 16 and 18, herein by a bridging block 424 separately connected to each of the clevis halves 16 and 18 with a suitable fastener herein bolts 426.

Biasing retaining elements 418 in one embodiment comprise straps or flexible members. As shown, straps 418, under tension, are coupled at one end 420A to a cantilevered beam at its remote end, and are coupled at the other end 420B to bridging block 424 coupled to clevis halves 16 and 18. Together, the biasing elements 418, bridging block 424, and fasteners such as 422 and 426 comprise a biasing assembly connected between the support (clevis halves 16 and 18) and the sensor body 12 to provide a bias force between the sensor body 12 and the clevis halves. As shown, a width 423 of the straps 418 is greater than a thickness 425 of the straps 418. A biasing assembly in one embodiment comprises a pair of straps provided on opposite portions of the transducer body that are symmetric in configuration, to allow for compliance in a direction orthogonal to the offset. For example only and not by way of limitation, the straps 418 may have a square cross-section, that is, an equal width 423 and thickness 425, or cylindrical, with a constant diameter in every cross-section direction, or other symmetric configurations such as will be evident to those of skill in the art.

A biasing actuator 432 (illustrated schematically with dashed lines) preloads the biasing structure 402 and in particular bends the cantilevered beams 404A and 404B by pulling on the bridging block 424 upwardly with the biasing actuator 432 operably connected to standoffs 434. Any form of actuator can be used such as but not limited to a hydraulic, electric, etc. In one embodiment the actuator 432 comprises a screw or bolt mechanically connecting the standoffs 434 with the bridging block 424.

A biasing force can be provided as follows. With a loose connection of the bridging block 424 to the clevis halves 16 and 18, each biasing actuator 432 on each side of the sensor body 242 is operated to obtain the desired preloading on the biasing structure 402 as a whole at which point the bridging blocks 424 are then securely fixed to the clevis halves 16 and 18 to retain the desired bias force. In one embodiment, the bias force from each cantilever 404A and 404B is iteratively increased until the desired bias force is obtained. The contribution of the bias force from each cantilever 404A and 404B should be the same so as to not induce a moment in the sensor body 242, but rather provide a purely linear bias force in a direction parallel to axis 63 in the illustrated embodiment.

Figure 26:
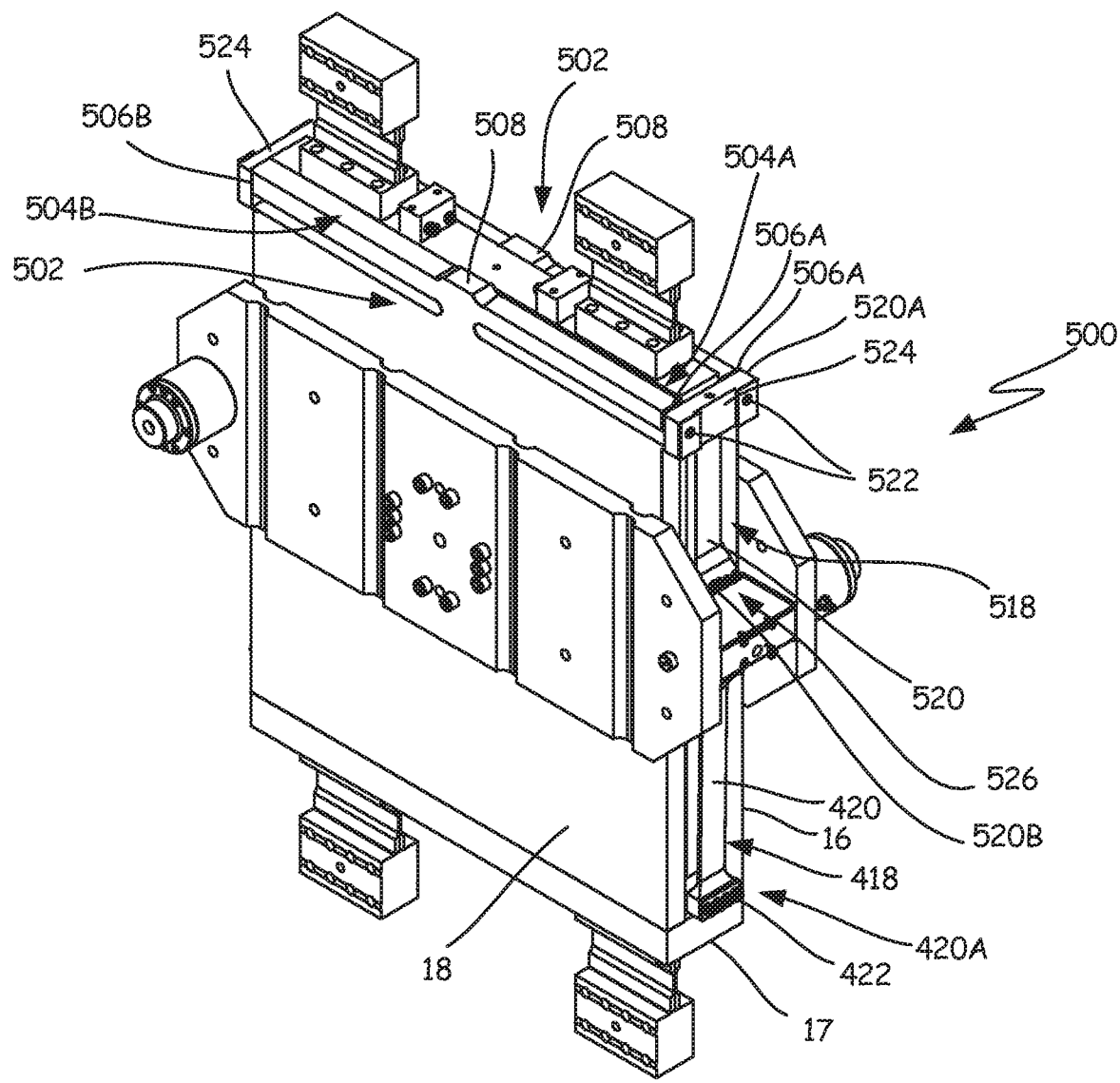
FIG. 26 is a perspective view of a transducer body according to another embodiment of the present disclosure.
Figure 27:
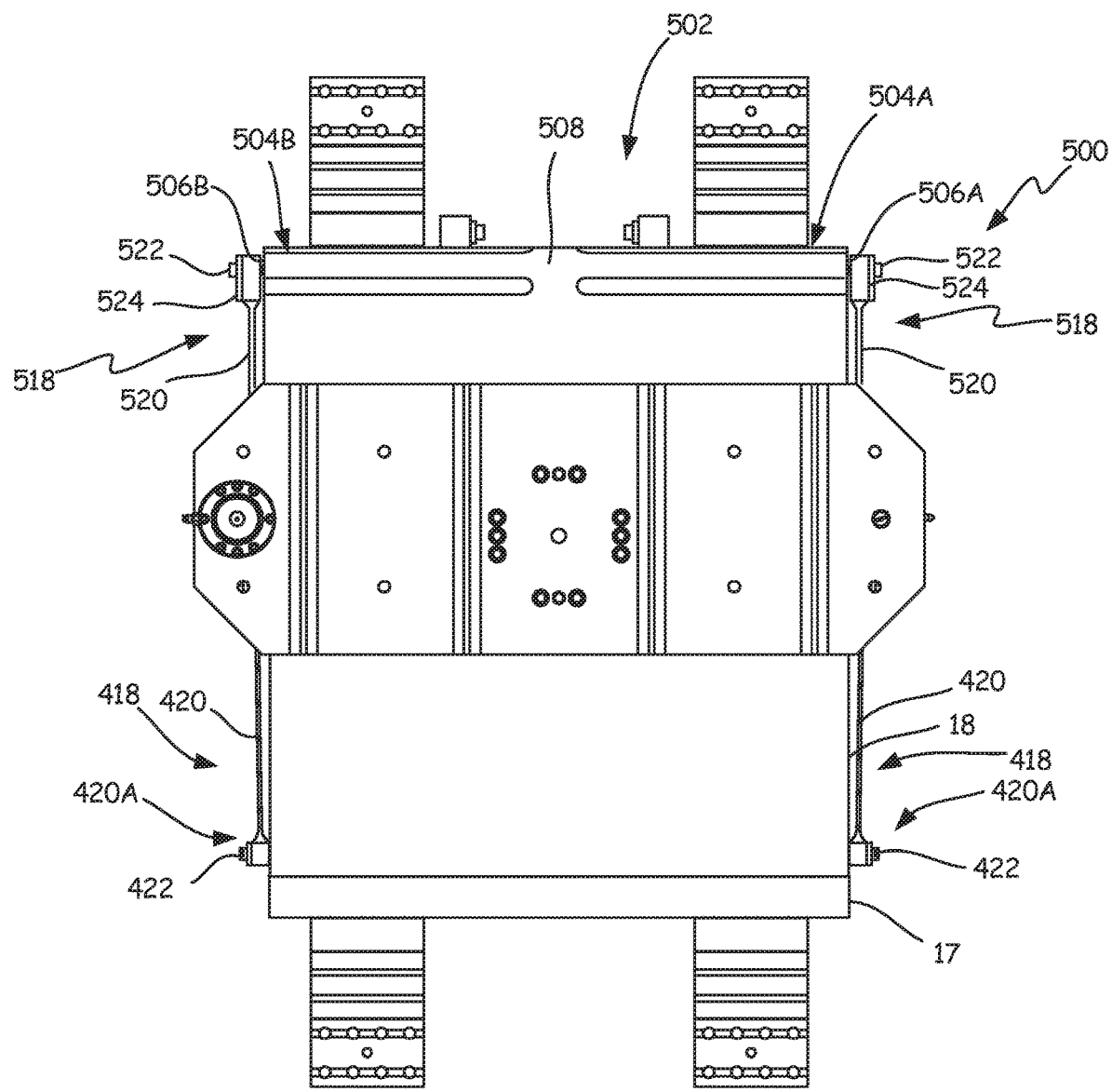
FIG. 27 is a front elevation view of the assembly of FIG. 26.
Figure 28:
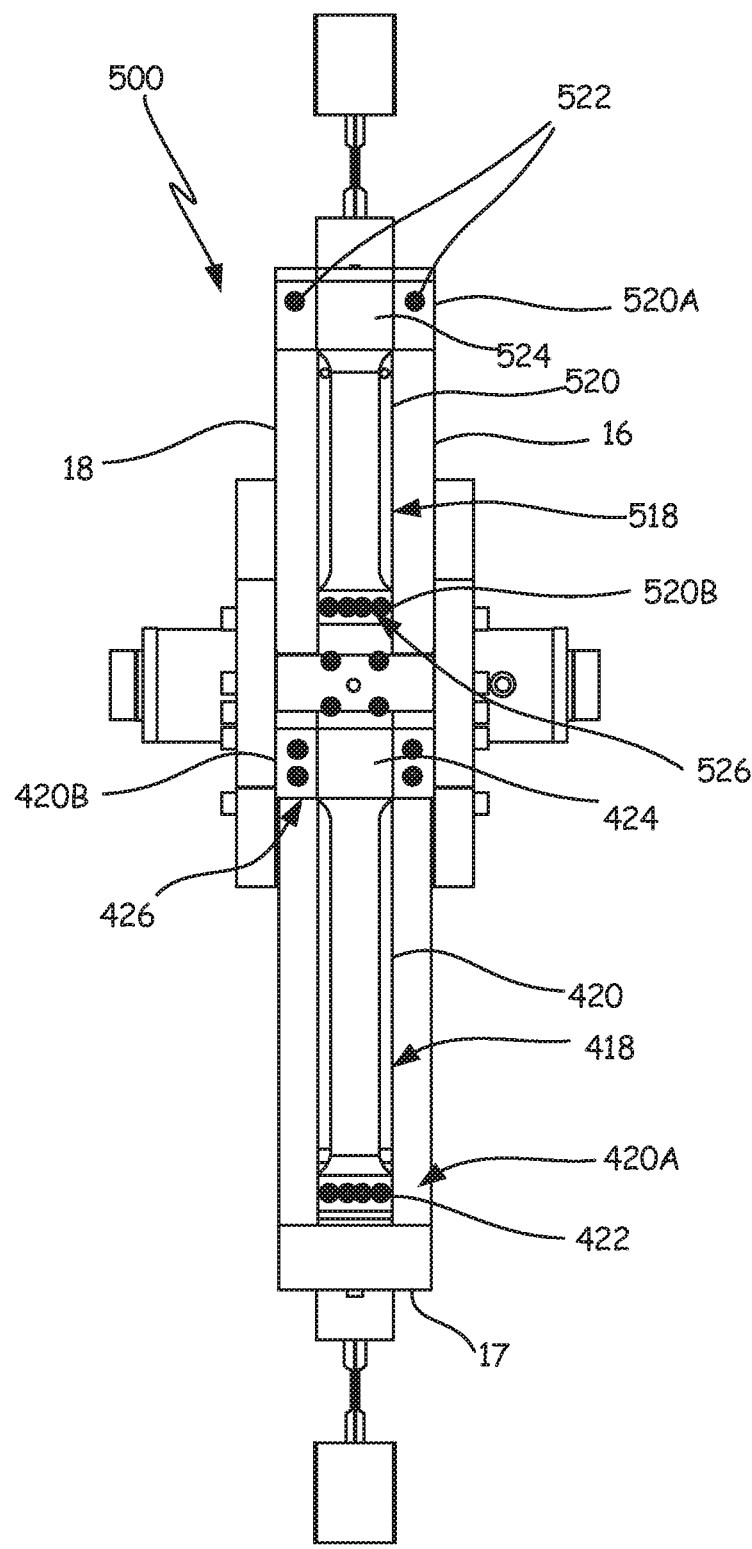
FIG. 28 is a right side elevation of the assembly of FIG. 26.

It should be noted that the biasing structure need not be provided on the sensor body 242, or only on the sensor body 242. FIGS. 26-28 illustrate a transducer assembly 500 having many of the same components of the previous transducer assembly, which have been identified with the same reference numbers. In this embodiment though, additional biasing structures 502 have been formed on each of the clevis halves 16 and 18. The biasing structure 502 is similar to biasing structure 402 discussed above; and thus, much if not all the discussion applicable to biasing structures 402 is applicable to biasing structures 502. For example, in one embodiment, cantilevered beams 504A and 504B and a single base support 508 are integrally formed from a single unitary body; however, this is but one embodiment, where other structures as described above with respect to biasing structure 402 can also be used.

Referring to FIG. 28, biasing retaining elements 518 connect the biasing structures 502 to the to the sensor body 242. In the embodiment illustrated, each of the biasing retaining elements 518 operate in tension and herein comprise elongated connectors 520 with a first end having a bridging block 524 at a first end 520A connecting the remote ends 506A or 506B together with a suitable fastener herein bolts 522. A second end 520B of each of the elongated connectors 520 is joined to the sensor body 242, with a suitable fastener herein bolts 526. Biasing retaining elements 518 in one embodiment have the properties and characteristics described above with respect to biasing elements 418.

In this embodiment, sensor body 242 also includes biasing structure 402 having similar components identified with the same reference numbers. A biasing actuator not shown but connectable in a manner similar to that described above and is in effect removably connected to each of the beams 404A, 404B so as to pull the beams 404A, 404B upwardly in FIG. 28 at which point the retainer 418 is securely fixed to retain the bias force such as by securely fixing the bridging block 424 to the sensor body 242. In a similar manner, a biasing actuator not shown but connectable in a manner similar to that described above and is in effect removably connected to each of the beams 504A of each clevis 16, 18 so as to pull the beams 504A or 504B in pairs on each side of the transducer 500 using corresponding bridging blocks 524 and suitable standoffs as needed. When the desired bias force is obtained in each pair of beams 504A and 504B, the associated end 520B of the bias retainer 518 can be securely fixed to the sensor body 242. As in the previous discussion of bias structure 402, any form of actuator can be used such as but not limited to screws or bolts, hydraulic, electric, etc.

Figure 29:
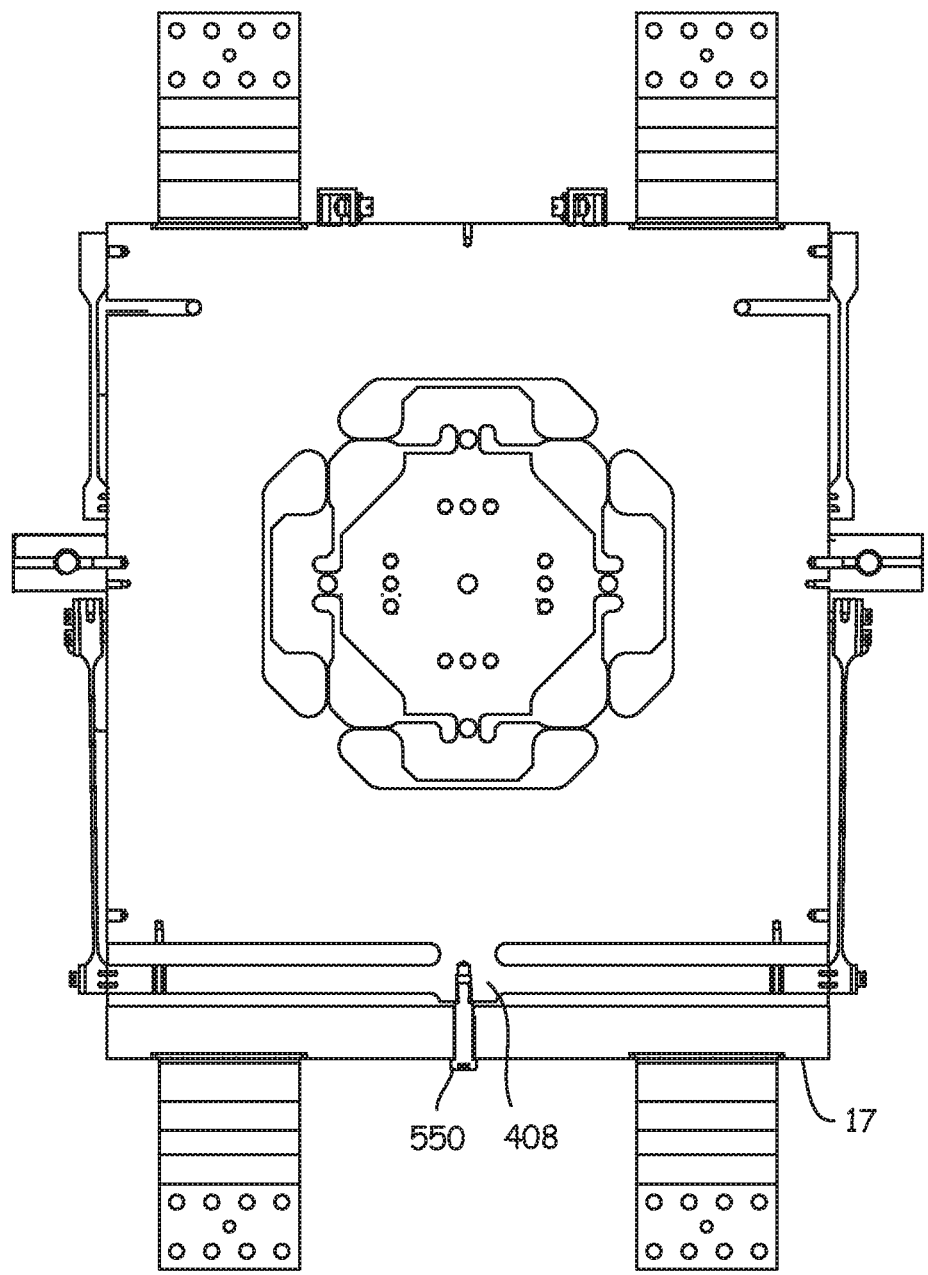
FIG. 29 is a cut away view showing a front elevation of a sensor body in place on the assembly of FIG. 26.
Figure 30:
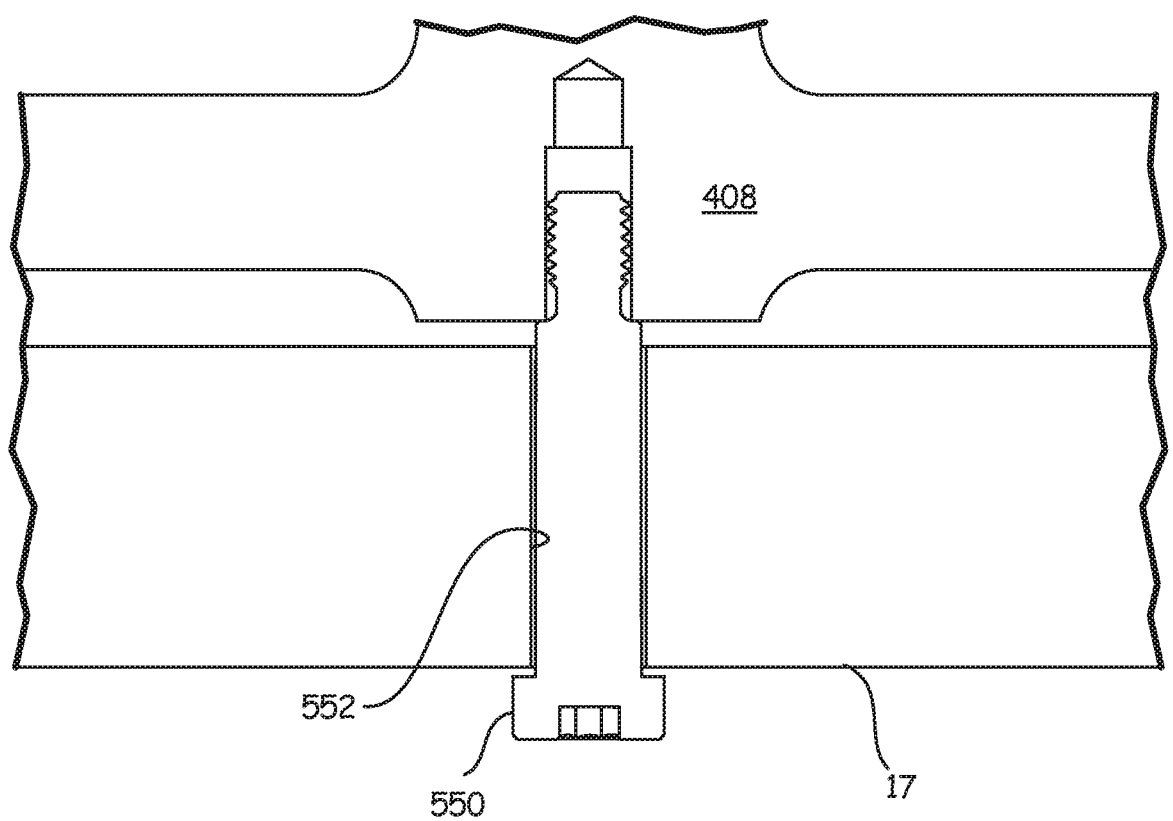
FIG. 30 is a close up view of a portion of FIG. 29.

An overtravel stop can be provided to limit the bias force created by the pairs of beams 504A and 504B on the clevis halves 16 and 18. Referring to FIGS. 29 and 30, a bolt 550 is secured to support 408 and extends through an aperture 552 provided in element 17 connecting the clevis halves 16, 18 together. The head of the bolt 550 is of size to be larger than the aperture 552. The bolt 552 is secured to the support 408 with the head of the bolt spaced apart from a surface of the connecting element a selected distance corresponding to a limit of bias force to be generated by beams 504A and 504B. Since loading of beams 504A and 504B causes the sensor body 242 to move upwardly in FIG. 29, contact of the head of the bolt 552 limits the bias force that can be generated.

Figure 31:
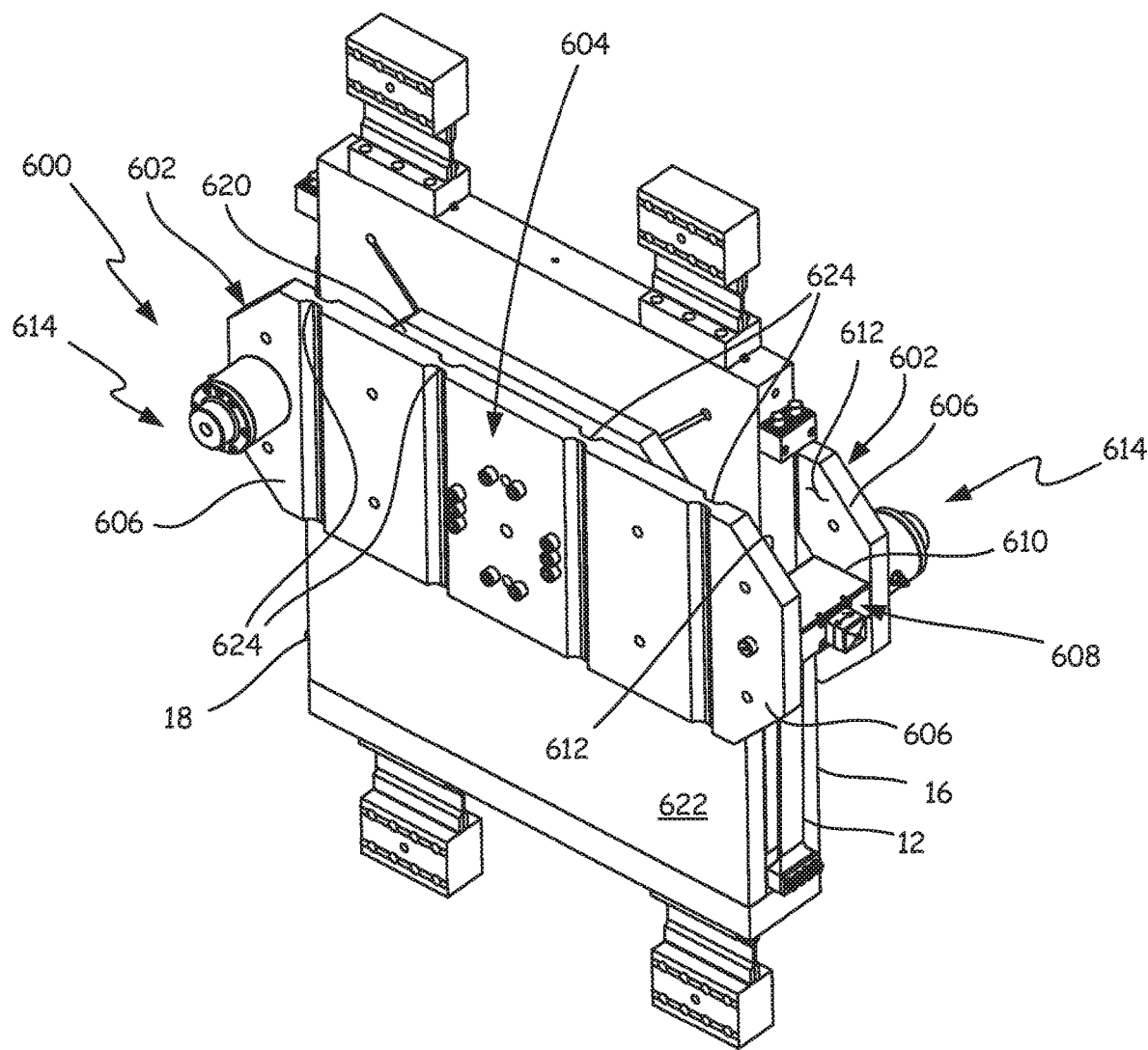
FIG. 31 is a perspective view of a clamp assembly in place on a transducer body according to another embodiment of the present disclosure.
Figure 32:
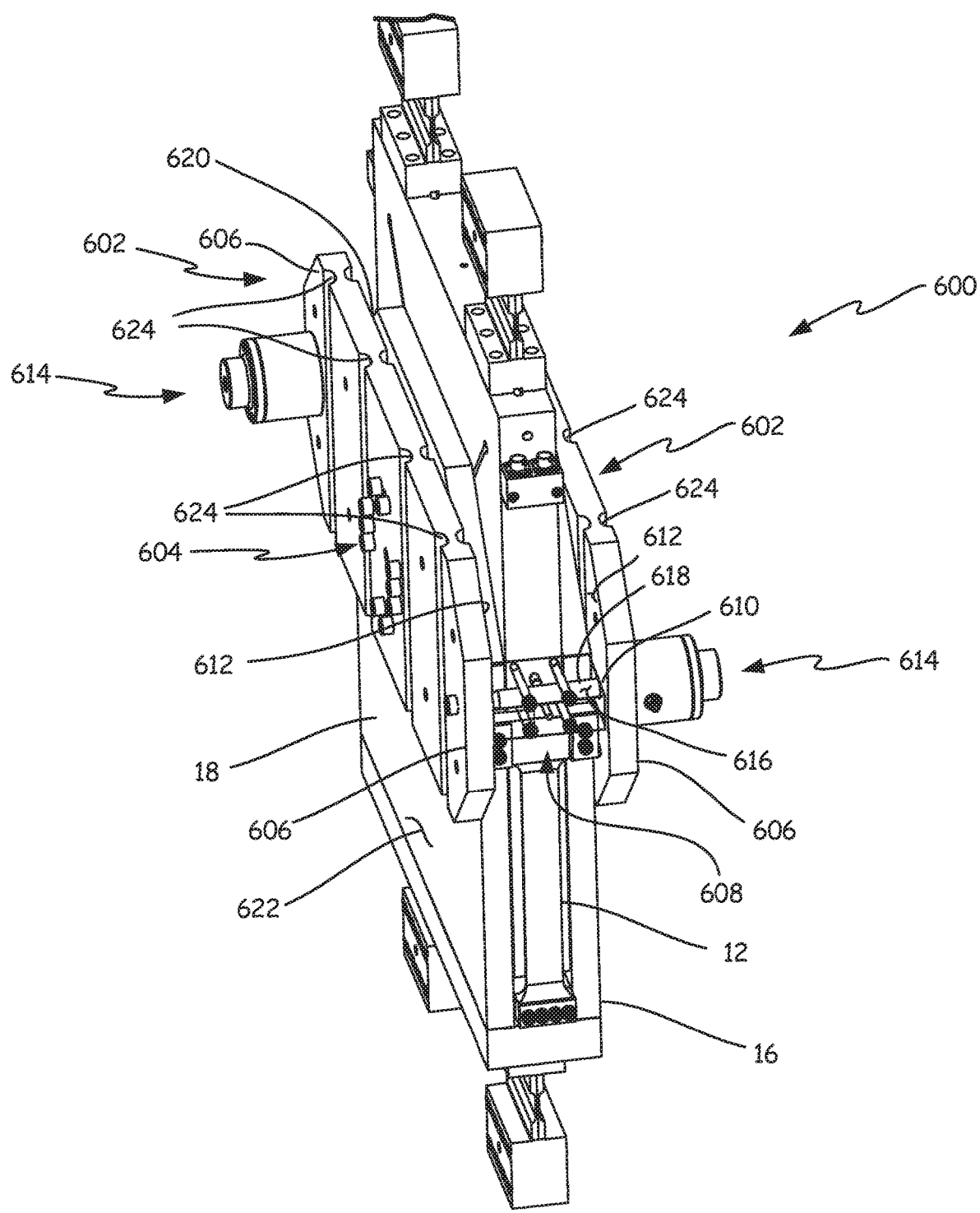
FIG. 32 is a close up and partial cut away view of a portion of the assembly of FIG. 31.

Another aspect of the present invention is a lock up assembly 600 that selectively secures the position of the sensor body 12 relative to the clevis halves 16 and 18. Referring to FIGS. 31 and 32, the lock up assembly 600 includes friction plates 602 attached to each of the clevis halves. Each friction plate 602 is attached to its corresponding clevis half with a fastener 604 such as a plurality of fasteners in the center of the plate. However, it should be noted that only the center of the plate is in permanent contact with the corresponding clevis halves in that the extending ends 606 of the friction plates 602 are spaced apart from the outer surface of the corresponding clevis half. A spacer 608 is securely fixed to the sensor body and is disposed between ends 606 of the friction plates 602 on each side of the transducer. The length of the spacer 608 is slightly shorter than the distance between the inner surfaces of the friction plates such that a gap 610 is present between one or both of the end surfaces of the spacer 608 and corresponding inwardly facing surfaces 612 of the friction plates 602. An actuator 614 is operably coupled to the friction plates 602. The actuator 614 includes a pull rod 616 that extends through a bore 618 in the spacer. The bore 618 is of size to maintain a gap between the pull rod 616 and the spacer 618 for movements of the sensor body 12 or the clevis halves 16 and 18 relative to the sensor body 12. When it is desired to inhibit movement of the sensor body 12 relative to the clevis halves 16 and 18, the actuator 614 is operated so as to retract the pull rod 616 which pulls the ends 606 of the friction plates 602 together thereby eliminating the gap(s) 610 between the end surface(s) of the spacer 608 and the inwardly facing surface(s) 612 of the friction plates 602 as well as eliminating the gap(s) 620 between the inwardly facing surface(s) 612 of the friction plates 602 and the outwardly facing surface 622 of each corresponding clevis half. As such, when the actuator 614 is operated, a solid connection is formed between the spacer 608 and the friction plates 602 wherein the friction plates 602 frictionally engage the outer surfaces 622 of each corresponding clevis half.

The actuator 614 can be of any suitable form such as but not limited to an electric, hydraulic, or pneumatic actuator.

In the embodiment illustrated, each of the friction plates 602 includes areas of reduced thickness that form flexible hinges 624. The flexible hinges 624 ensure that the ends 606 of the friction plates 602 will maximize contact of the end surfaces of the friction plates 602 with the clevis halves 16 and 18 rather than being slightly at an angle if the flexible hinges 624 were not present. In other words, the portion of the friction plates 602 that secure the friction plates 602 to the clevis halves by the fasteners indicated at 604 is maintained in a planar fashion to the corresponding clevis halves. Likewise, when the actuator 614 is operated, each of the end portions 606 of the friction plates 602 will contact the corresponding clevis half in a planar fashion. Any slight difference in width between the center sections of the friction plates 602 and the end portions of the friction plates 602 is accommodated by the middle sections between each of the flexible hinges 624.

The embodiments pre-loading the transducer body with respect to the clevis plates, as shown and described above, allow for accurate full scale measurement even if the tare weight placed on the platform 300 is many times a full scale measure load weight. For example, a 20,000 pound upper frame is supportable with four transducer bodies while still allowing accurate measurement of loads in a full scale measure load of +/−2,000 pounds vertical, without frequency degradation of a dead-weight type tare system. Such embodiments are amenable to use with other load cells where tare mitigation is employed, without departing from the scope of the disclosure.

In such a pre-loading, thermal expansion differences can lead to thermal structural temperature equilibration between components of the transducer body and any sensing elements therein. Thermal expansion differences between, for example, parallel springs (e.g., the cantilevered beams) in series with straps and those in parallel with gauged beam assemblies, and the resulting disparate temperatures between elements, may result in thermal drift for a duration of a test.

Figure 33:
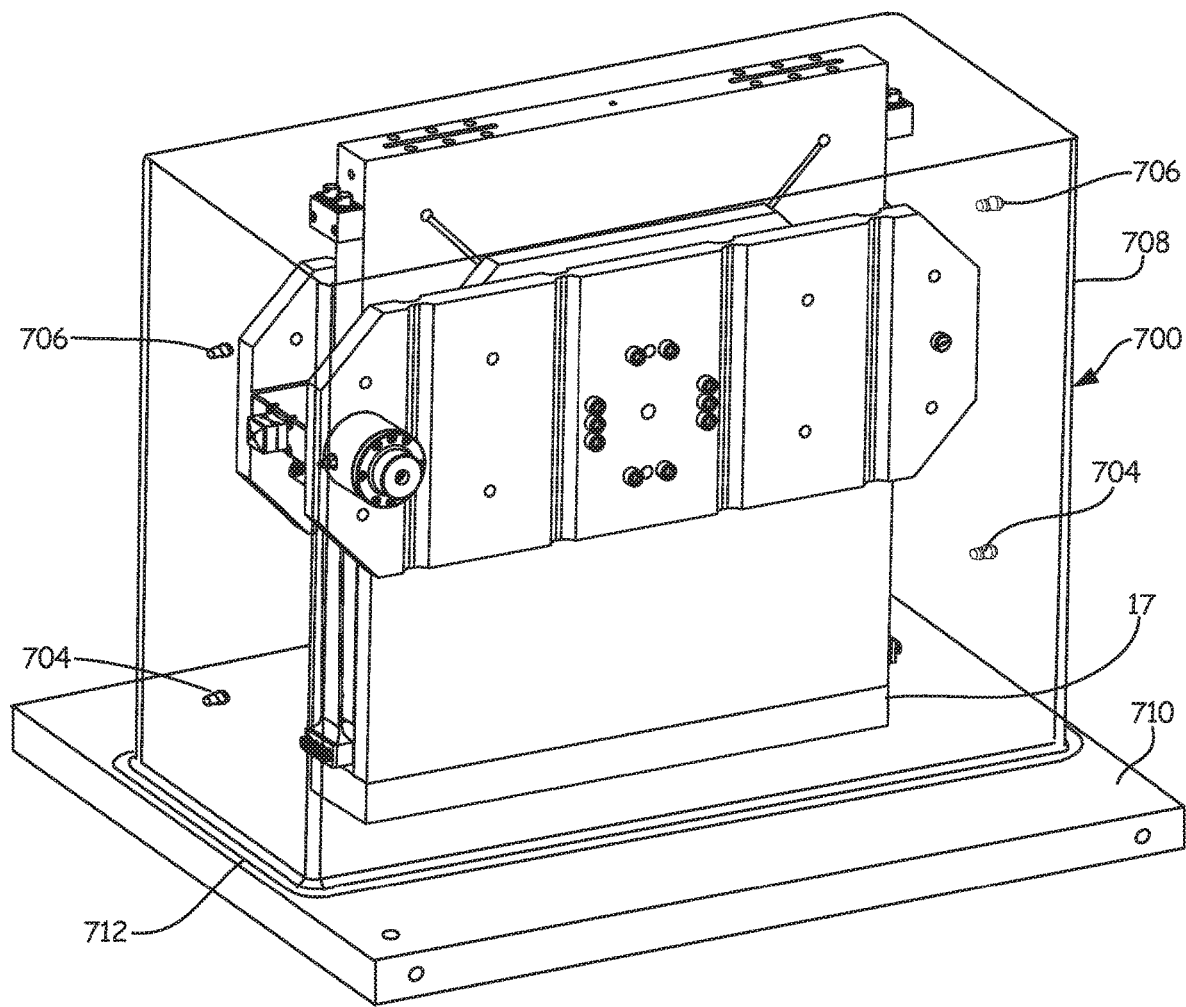
FIG. 33 is a perspective view of a transducer body in a fluid recirculating bath assembly according to another embodiment of the present disclosure.

FIG. 33 shows a fluid enclosure 700 for a transducer assembly such as the various transducer assembly embodiments described herein. In one embodiment, fluid enclosure 700 is an oil enclosure or oil bath, such as a fluid recirculating bath assembly. Elements of the transducer, especially straps, cantilevered beams, gauged elements, sensor body, clevis plates, and bottom plates, are immersed in the fluid of the fluid enclosure 700, and are held in one embodiment to a same temperature with a tolerance of about 0.1° F. for a testing cycle. In one embodiment, fluid enclosure 700 contains an oil 702 heated to a desired temperature at which the elements of the transducer are to be held. Oil 702 has high thermal mass and very good heat conduction and convection to and with the elements of the transducer assembly. This allows maintenance of thermal uniformity within a desired tolerance even when the transducer assembly is in an operating wind tunnel.

Figure 34:
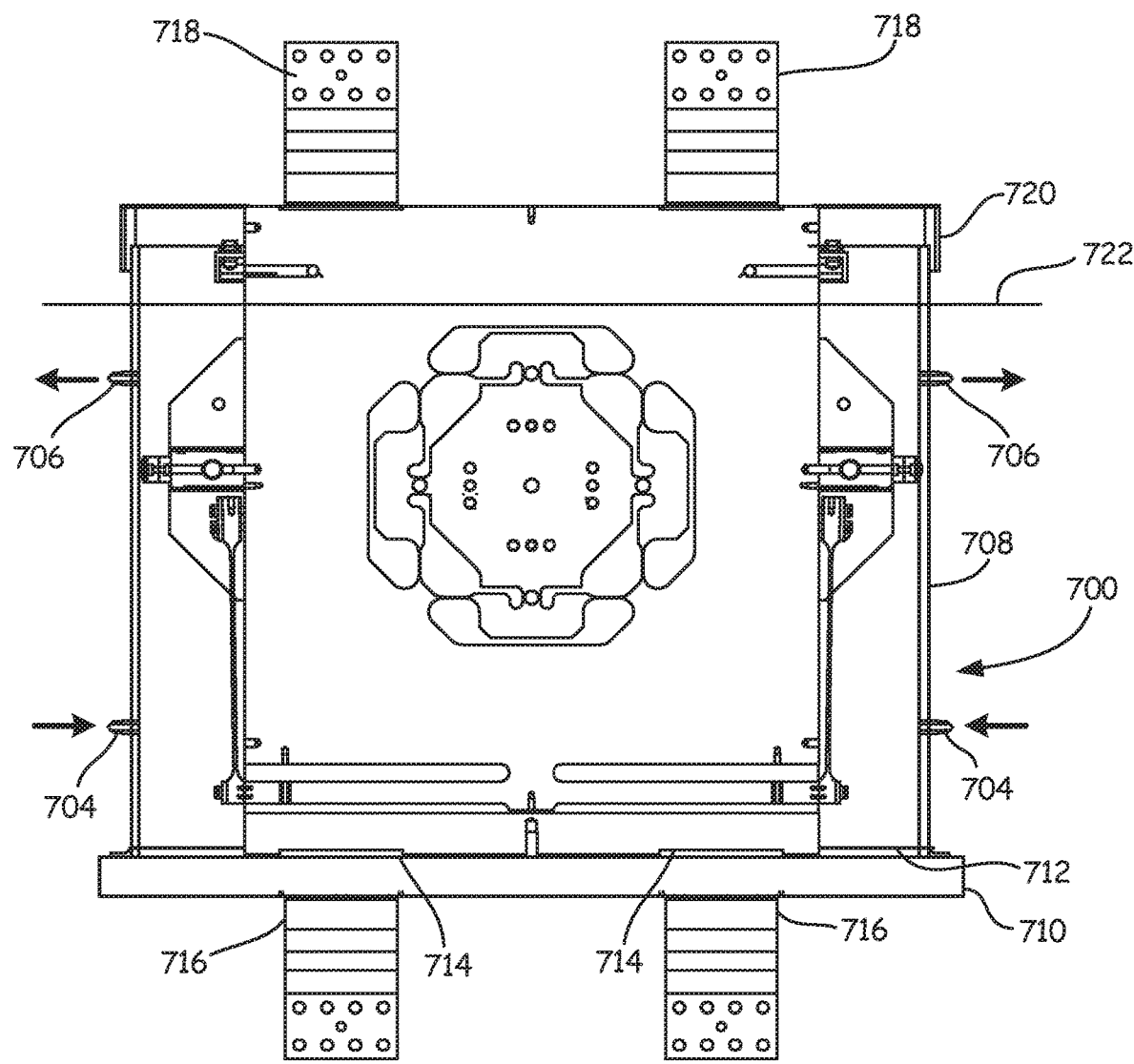
FIG. 34 is a front elevation view of the assembly of FIG. 33.
Figure 35:
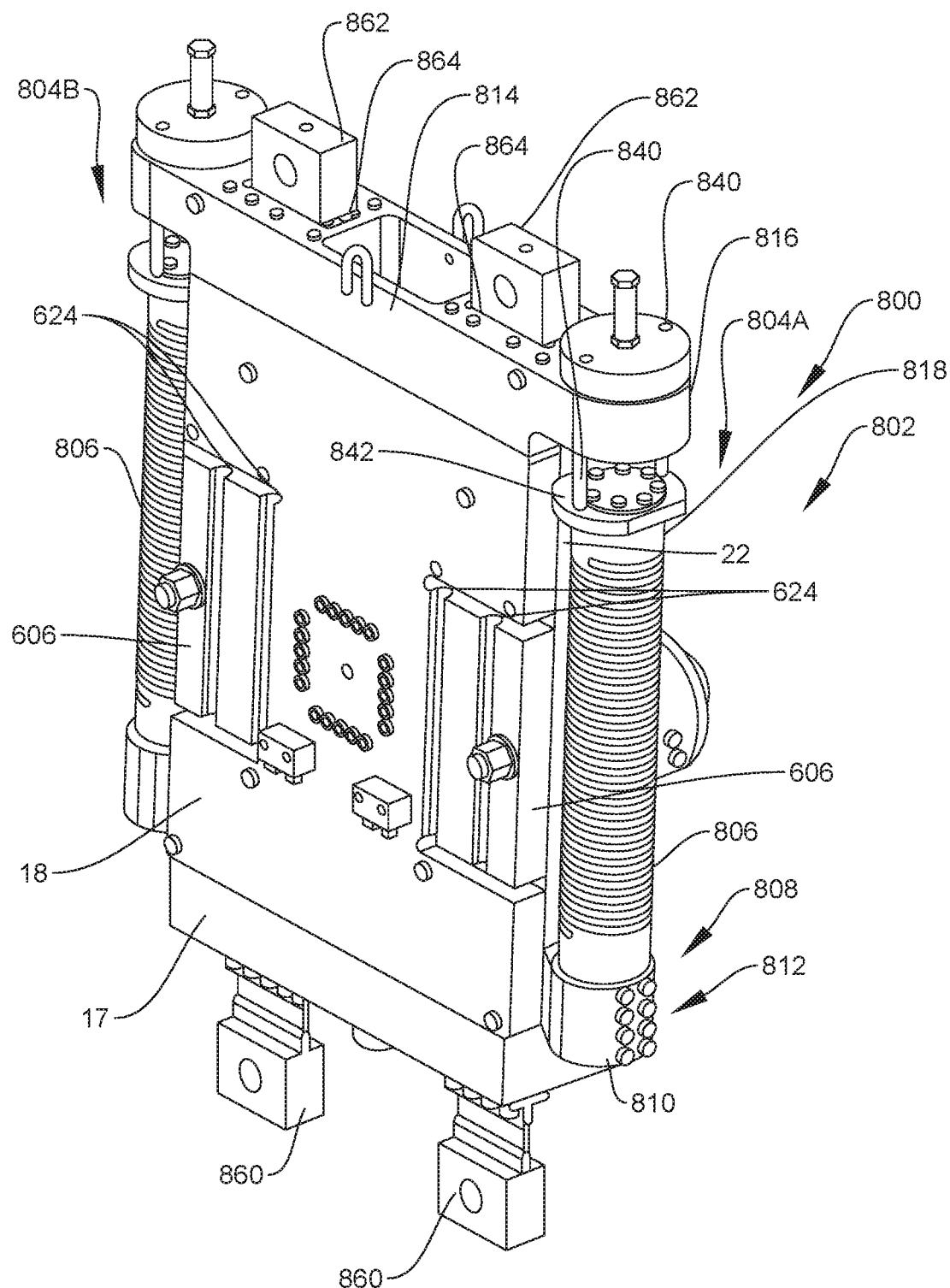
FIG. 35 is a perspective view of a transducer assembly according to another embodiment of the present disclosure.
Figure 36:
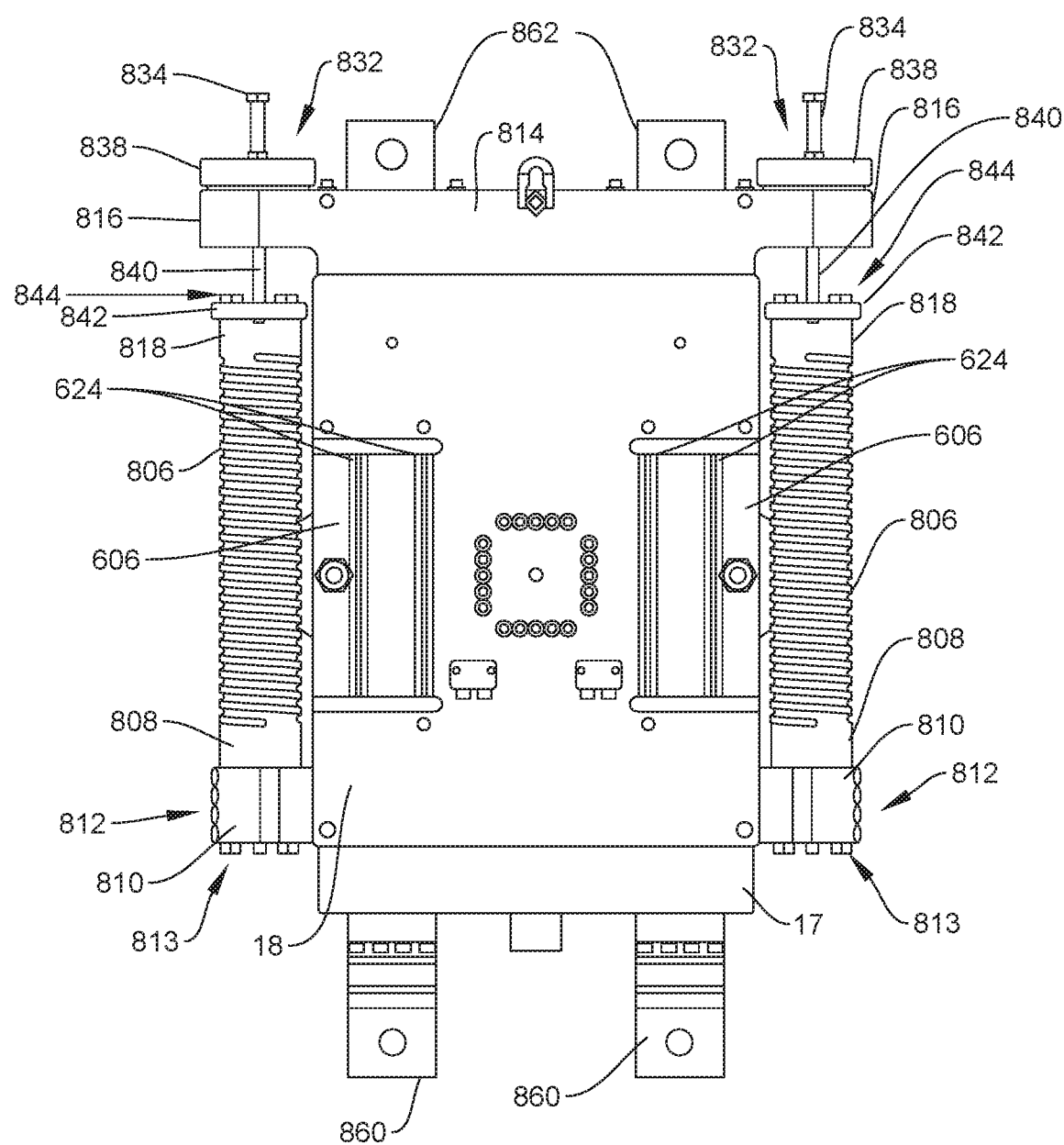
FIG. 36 is a front elevational view of the transducer assembly of FIG. 35.
Figure 37:
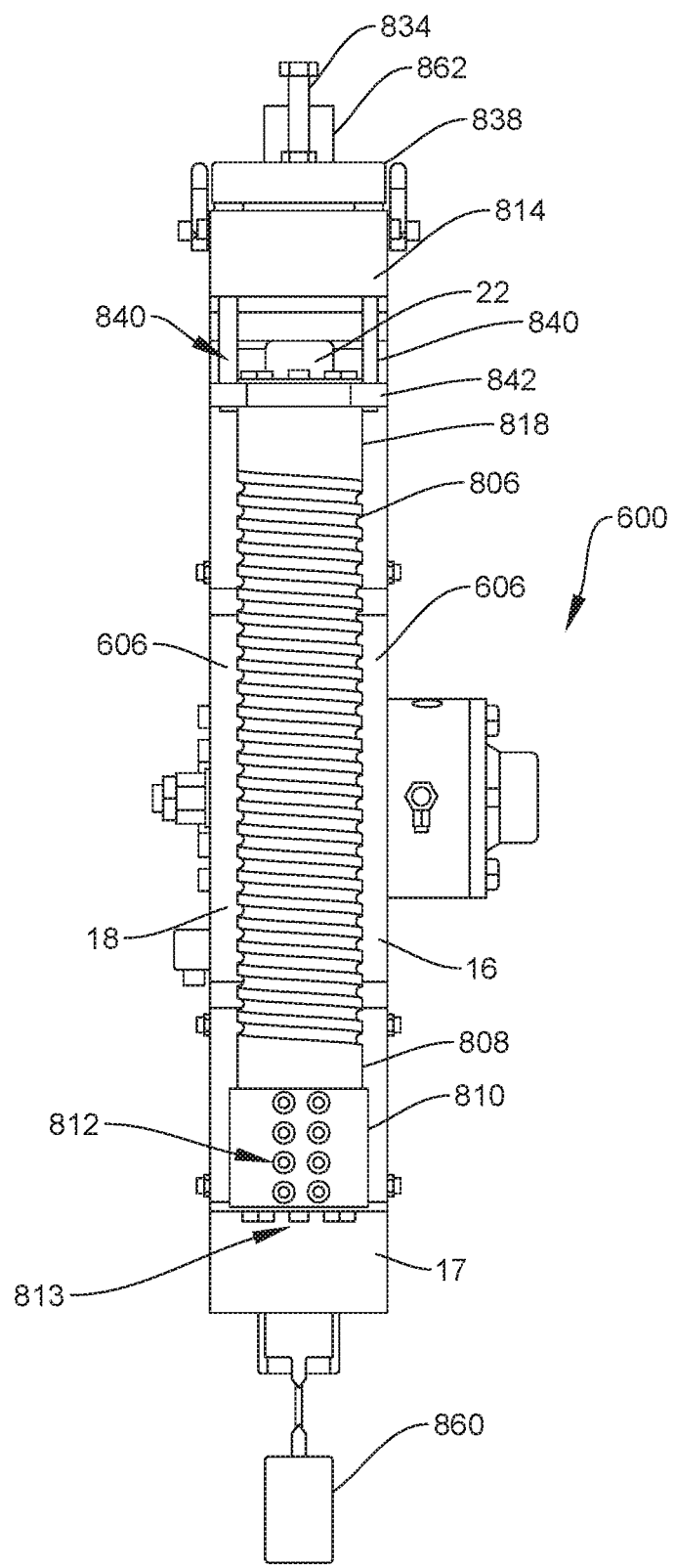
FIG. 37 is a right-side elevational view of the FIG. 35.
Figure 38:
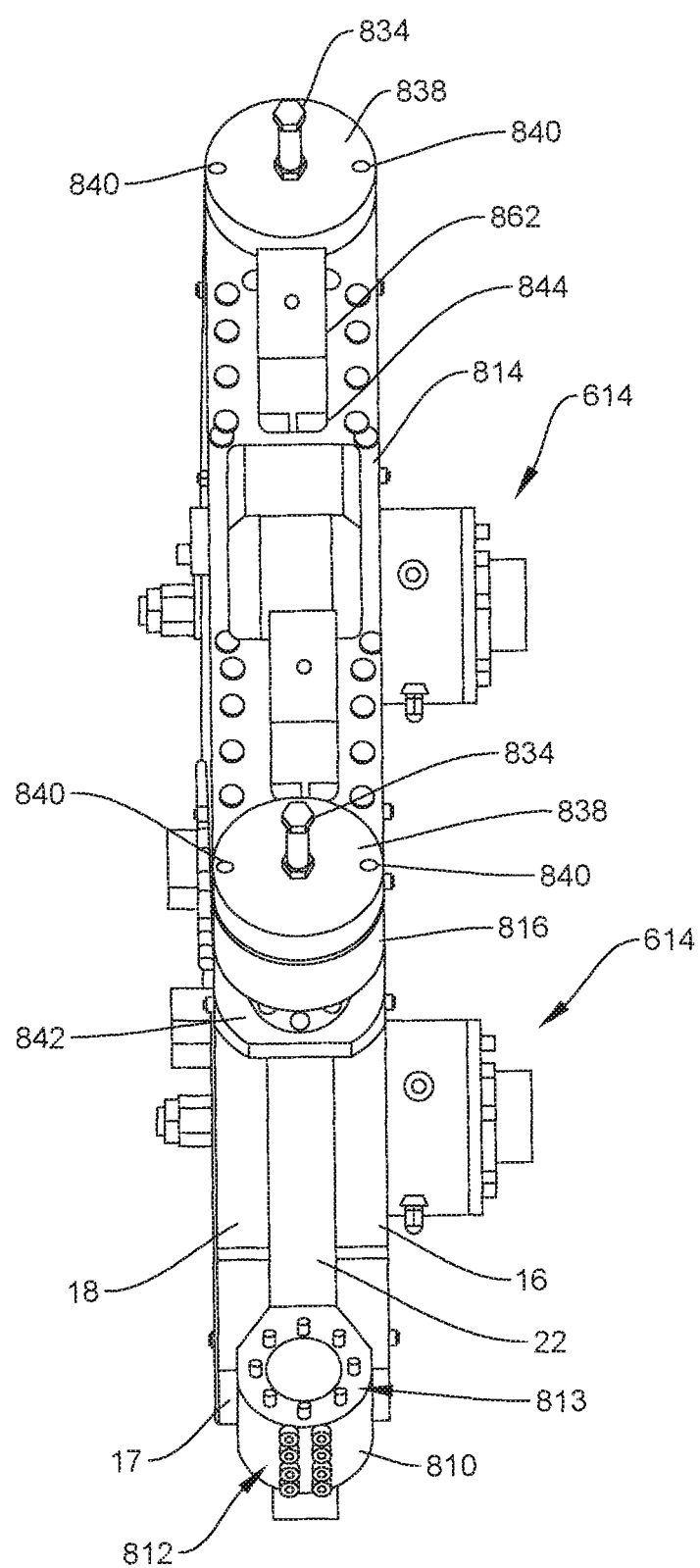
FIG. 38 is a perspective view of the transducer assembly of FIG. 35 with parts removed.

Oil enclosure 700 further comprises cross flow inlets 704 and outlets 706, and a fluid circulating bath tank 708 mounted to a plate 710. A gasket 712 seals tank 708 to plate 710 in one embodiment. Further gaskets 714 may be used to seal plate 710 to a bottom plate such as connecting member 17 of a transducer body (FIG. 1), for example by sealing each bolt between bottom flexures 716 and connecting member 17, or by sealing with a larger gasket around a circumference of the bottom flexures 716. Top flexures 718 may be coupled, for example with bolts, to the sensor body of the transducer assembly. Associated plumbing (not shown) provides oil 702 at the desired temperature for the components to the enclosure 700 via inlets 704, recirculated to the plumbing and heater (not shown) via outlets 706. A top cover 720, shown in FIG. 34, may be used to provide protection against contaminants such as dirt or dust into the tank 708. In one embodiment, oil is provided to fill tank 708 to fill line 722, so that sensing elements that may be in the transducer body are completely submerged in the oil.

FIGS. 35-39 illustrate a transducer body 800 having many of the same components of the prior transducer assemblies, the parts of which have been identified with the same reference numbers. As in the earlier embodiment, clevis halves 16 and 18 are joined together by the connecting member 17. A sensor body 12, for example, similar to that illustrated in FIG. 2 includes a rigid perimeter structure 22 identified in FIGS. 35 and 37-39. A biasing structure 802 is operably coupled to the clevis halves 16 and 18 and the sensor body 22. In this embodiment, the biasing structure 802 includes first and second spring assemblies 804*a* and 804*b* disposed on opposite sides of the transducer assembly 800. Each assembly, 804*a* and 804*b* includes a spring 806 (herein operative in tension) having a first end 808 coupled to the perimeter body 22 of the sensor body using a mount 810 secured to the perimeter by 22 with fasteners 812 (see also FIG. 38). A second connecting member 814 also joins the clevis halves 16 and 18 together on ends opposite the connecting member 17. The connecting member 814 includes opposed ears 816 that secure a second end 818 of each spring 806 to a corresponding ear 816 of connecting member 814 and thus to the clevis halves 16 and 18.

Figure 39:
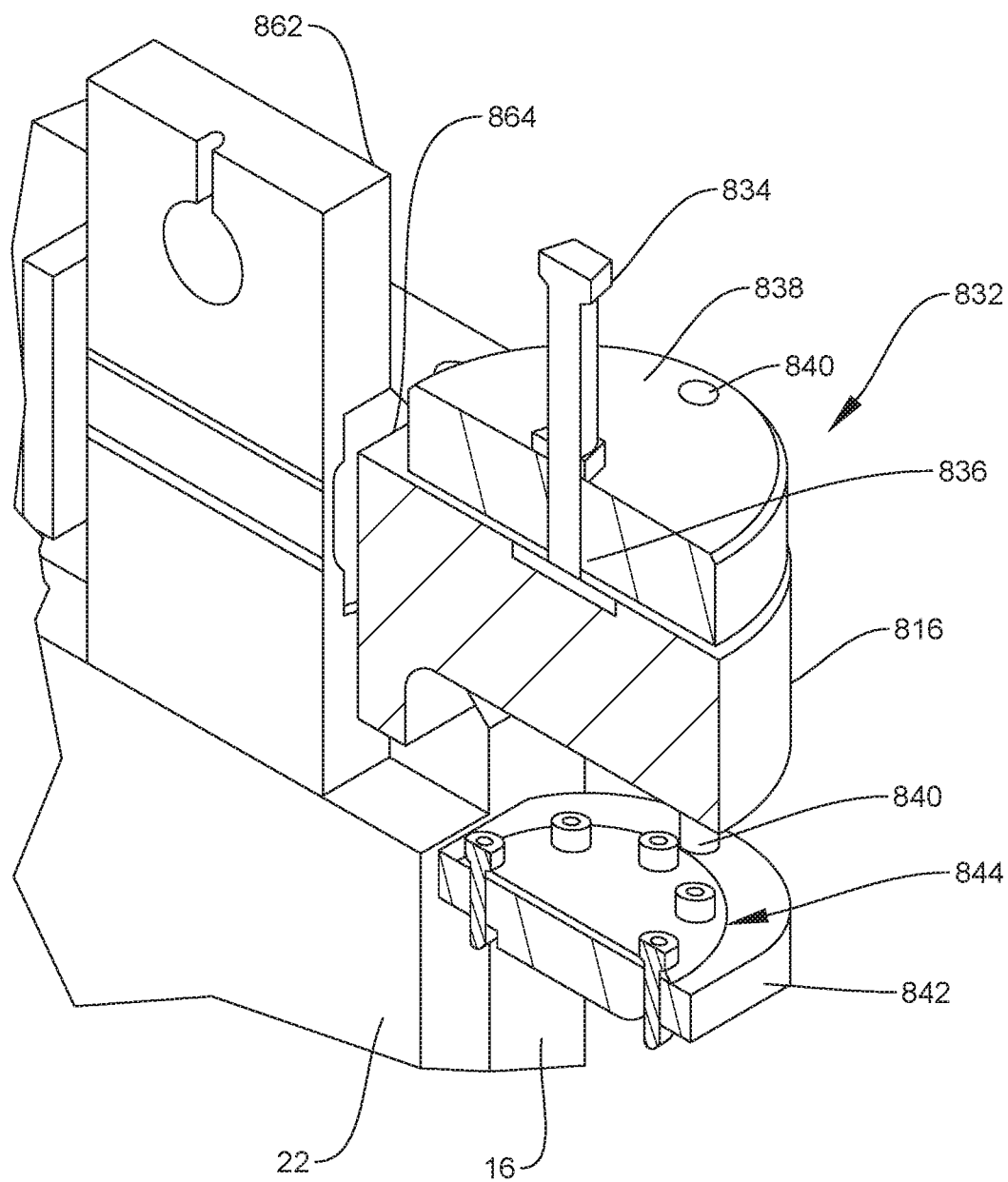
FIG. 39 is a sectional view of a portion of the transducer assembly of FIG. 35.

A biasing actuator 832 is provided for each of the springs 806. Referring also to FIG. 39, the biasing actuator 832 includes an actuating member herein comprising a bolt 834 having an end 836 in engagement with ear 816. The actuating member or bolt 834 is used to create separation between a plate 838 and the ear 816. The plate 838 is coupled to end 818 of spring 806 with rods 840 that extend from plate 838 and through suitable apertures provided in ear 816. The rods 840 are connected to a mounting plate 842 that in turn is mounted to the end 818 of the spring 806 using a plurality of fasteners 844. As the actuating member 834 is operated so as to increase the space between plate 838 and ear 816, coupling rods 840 pull the end 818 of the spring 806 toward the ear 816 thereby creating a bias (tension force) between the sensor body 22 and the clevis halves 16 and 18.

It should be noted that the transducer assembly 800 includes mounts 860 fixedly secured to the connecting member 17 and thus the clevis halves 16 and 18. Likewise, mounts 862 are secured to or formed integrally as a single unitary body with the perimeter body 22. Each mount 862 extends through a corresponding aperture 864 provided in connecting member 814.

The embodiment illustrated in FIGS. 35-38 include the lock up assembly 600 having similar components identified with reference numbers as described above, in this embodiment extending end 606 directly engage the sensor body or perimeter body 22.

Figure 18:
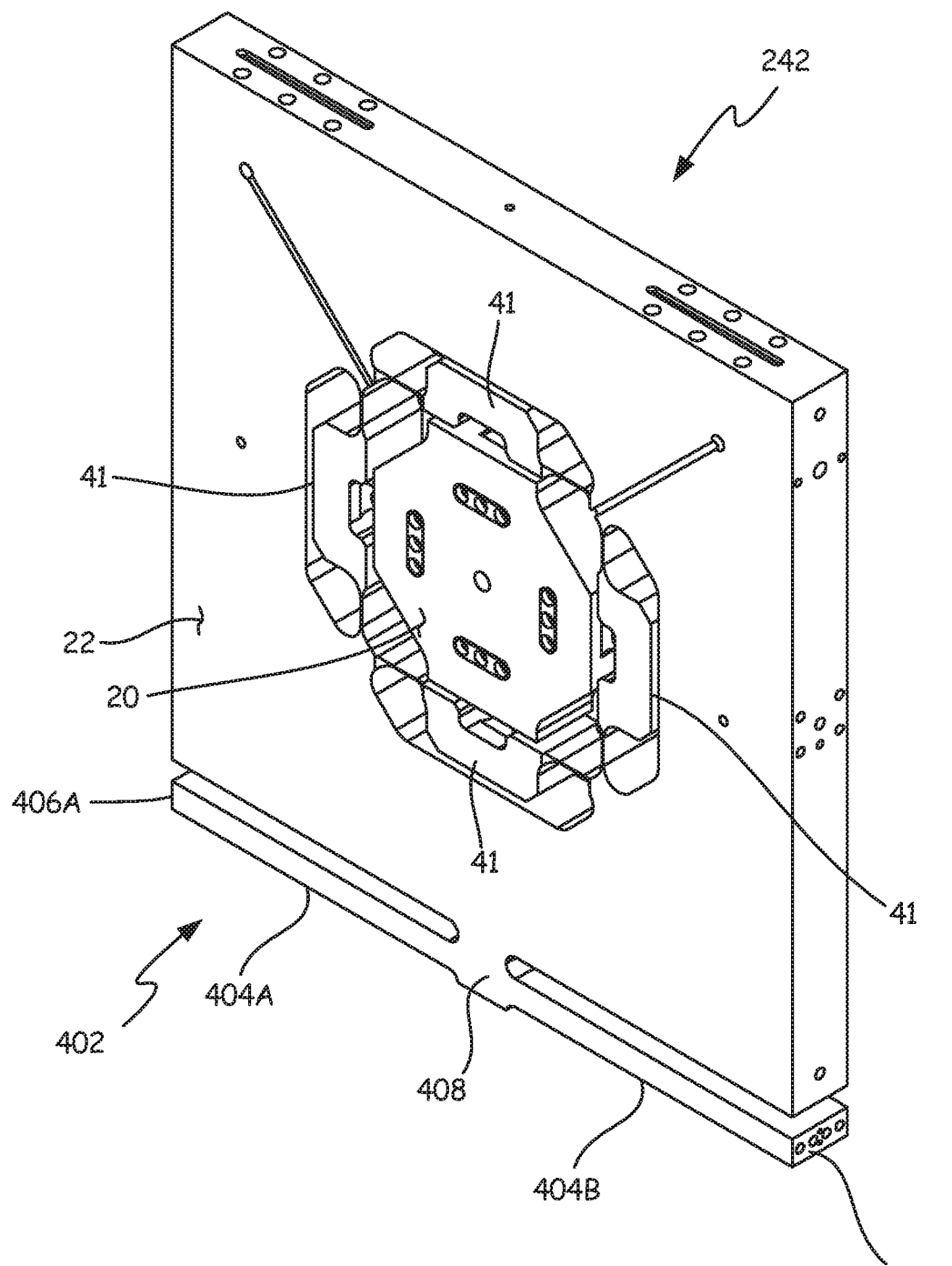
FIG. 18 is a perspective view of the sensor body of FIG. 16.
Figure 19:
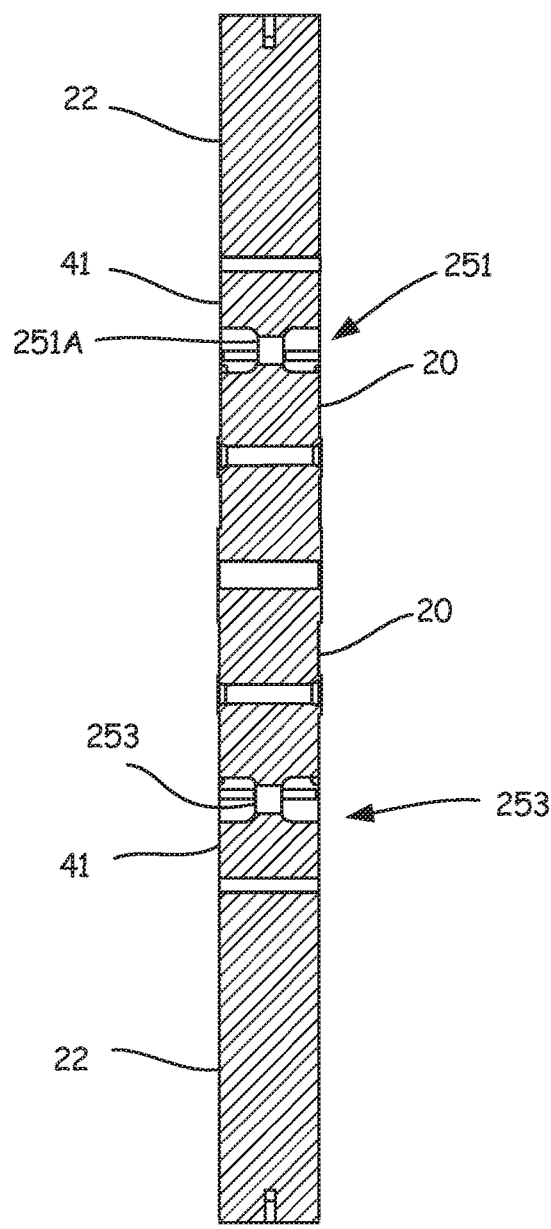
FIG. 19 is a cut away view along lines 19-19 of FIG. 16.
Figure 20:
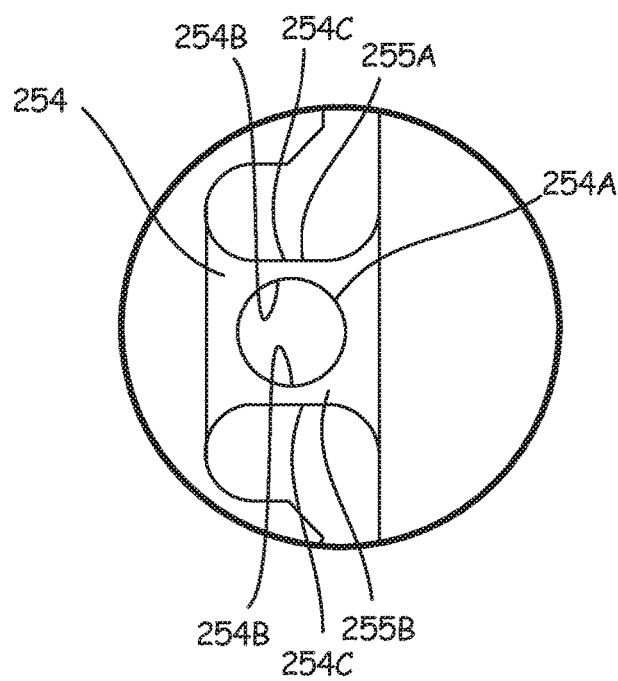
FIG. 20 is a close up view of a flexure element of FIG. 16.
Figure 21:
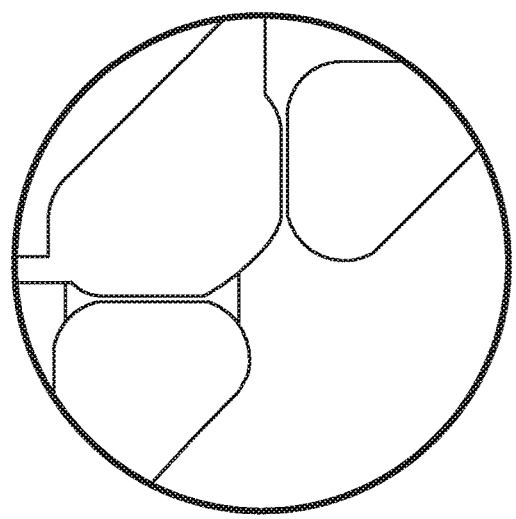
FIG. 21 is a close up view of an alternate flexure element according to another embodiment of the present disclosure.
Figure 40:
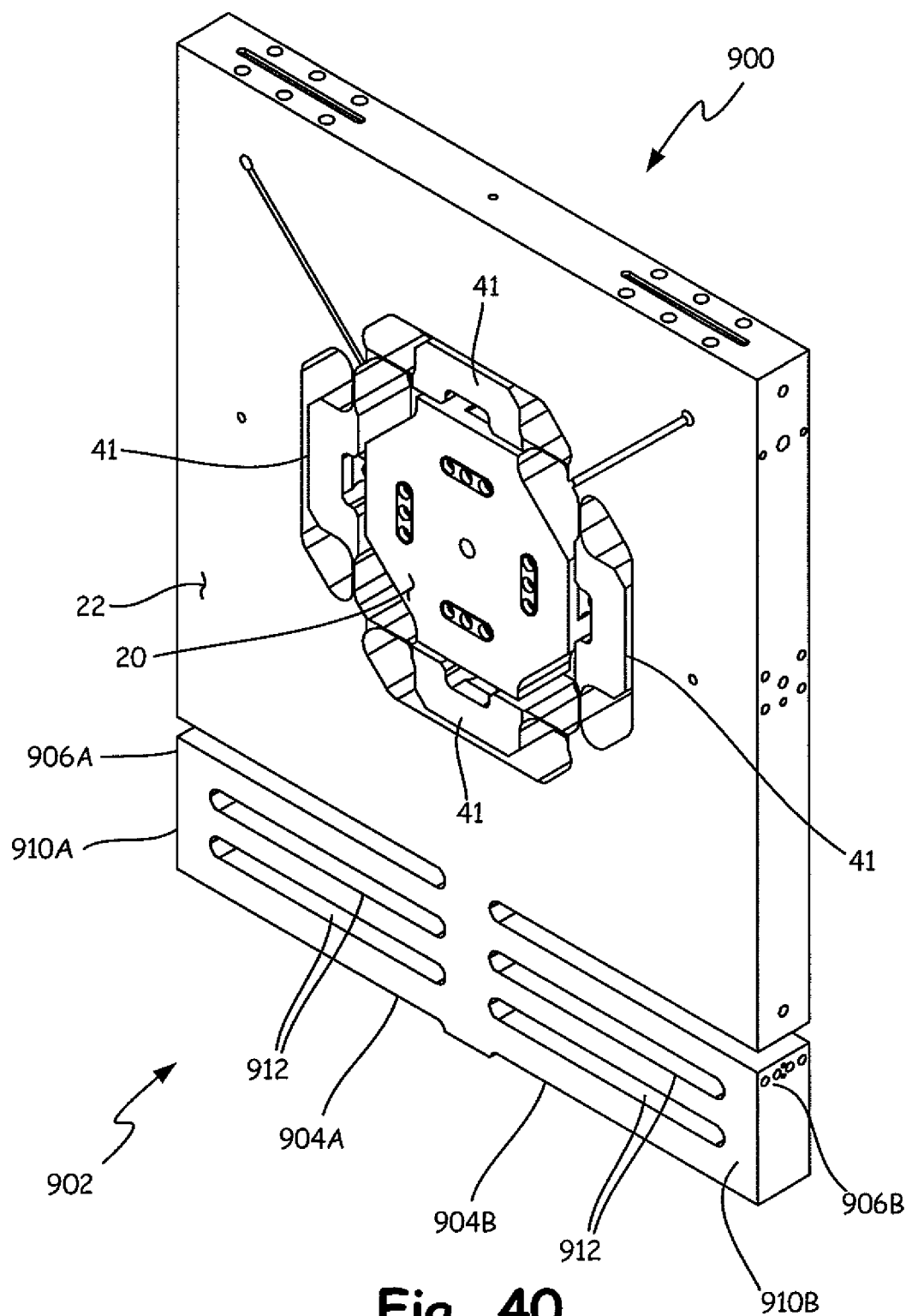
FIG. 40 is a perspective view of a transducer assembly according to another embodiment of the present disclosure.

FIG. 40 illustrates a transducer body 900 having many of the same components of the prior transducer assemblies, the parts of which have been identified with the same reference numbers. In the embodiment of FIG. 40, the biasing structure 402 of FIG. 18 is modified. Sensor body 900 comprises a biasing structure 902 similar to that of structure 402 in FIG. 18. In this embodiment, pair of cantilevered beams 904A and 904B are used in place of the beams 404A and 404B. The biasing structure 902 comprises cantilevered beams 904A and 904B. In the embodiment illustrated, remote ends 906A and 906B extend in opposite directions where each of the beams 904A and 904B are mounted to the sensor body 900 by a base support 908. It should be noted that use of a single base support 908 is not necessary in that the cantilevered beams 904A and 904B can each have a separate base support secured to sensor body 900; however use of a single base support 908 is of a simpler construction. Likewise, although illustrated with the beams 904A and 904B extending in opposite directions alternative embodiments may have the beams extend toward each other.

Beams 904A and 904B comprise a body 910A and 910B, with bodies 910A, 910B each having a plurality of milled slots 912 therein. The number of milled slots may be chosen for a desired amount of deflection. The higher the number of slots, the greater the deflection allowed. Multiple thin beams, such as are created from the body 910A, 910B with milled slots 912, store more energy than a solid beam, and at a lower stress level. The beams 904A and 904B are strapped in the same way as beams 404A and 404B as described above.

Figure 41:
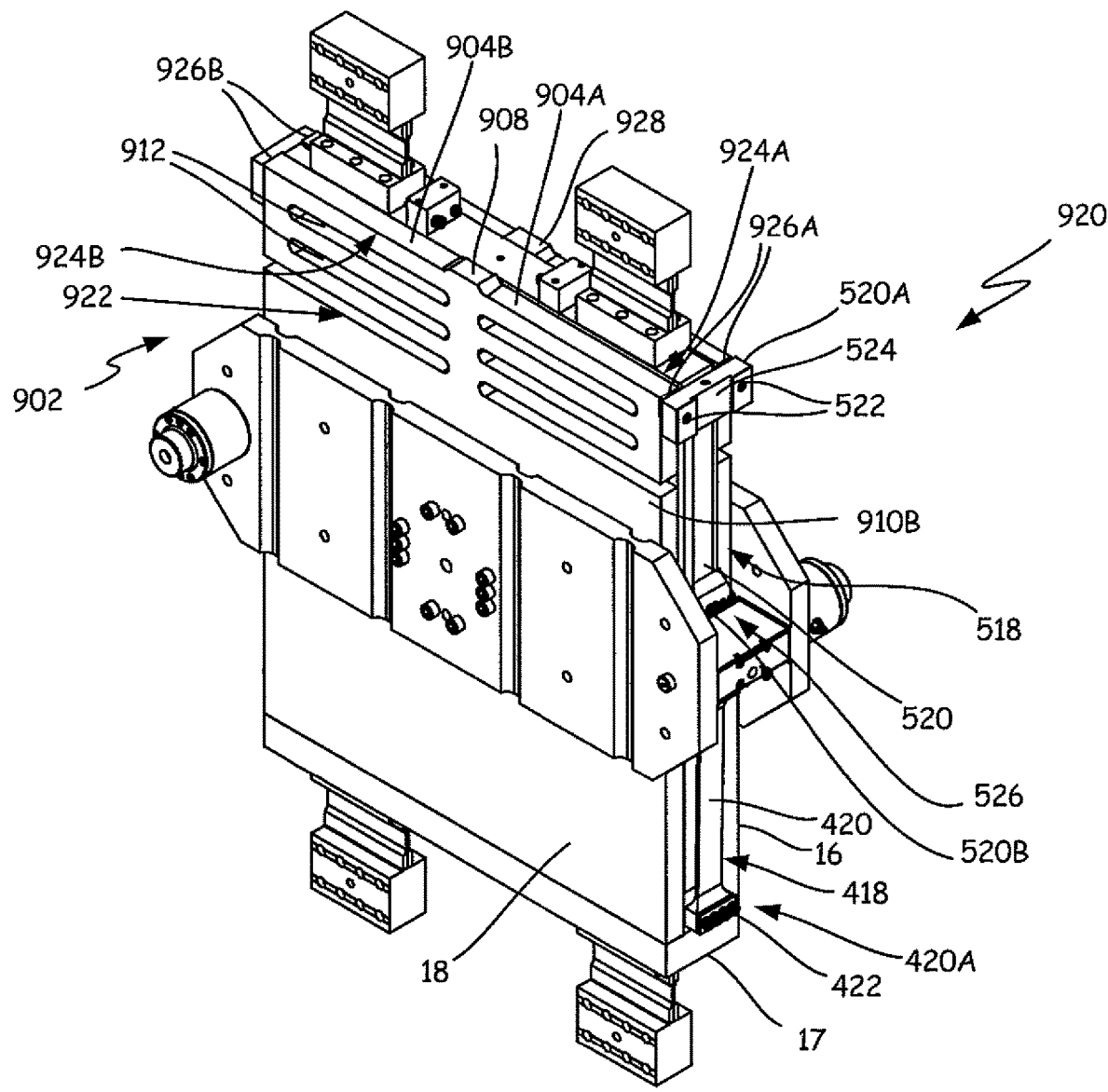
FIG. 41 is a perspective view of a transducer assembly according to yet another embodiment of the present disclosure.

FIG. 41 illustrates a transducer assembly 920 having many of the same components of the prior transducer assemblies, the parts of which have been identified with the same reference numbers. FIG. 41 shows an embodiment 920 in which biasing structure 922 having beams 924A and 924B is formed on clevis halves 16 and 18 instead of on a sensor body. The biasing structure is similar to biasing structure 902 discussed above; and thus, much if not all the discussion applicable to biasing structures 902 is applicable to biasing structures 922. For example, in one embodiment, cantilevered beams 924A and 924B having ends 926A and 926B and a single base support 928 are integrally formed from a single unitary body; however, this is but one embodiment, where other structures as described above with respect to biasing structure 902 can also be used. The beams 924A and 924B are strapped in the same way as beams 504A and 504B as described above.

Figure 42:
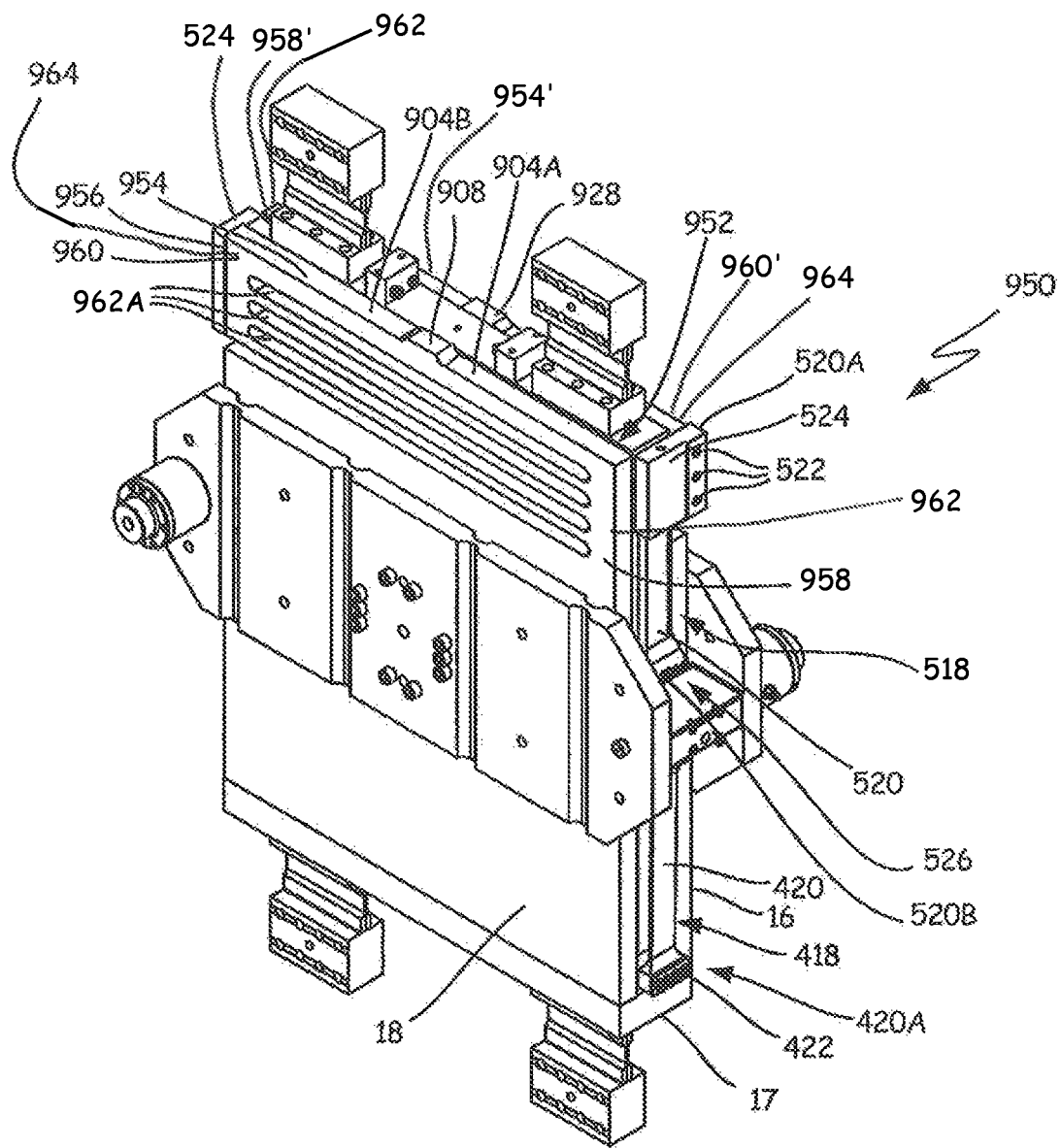
FIG. 42 is a perspective view of a transducer assembly according to still another embodiment of the present disclosure.

FIG. 42 illustrates a transducer assembly 950 having many of the same components of the prior transducer assemblies, the parts of which have been identified with the same reference numbers. In another embodiment 950 of the present disclosure, shown in FIG. 42, a biasing structure 952 is shown. Biasing structure 952 uses a single cantilevered beam 954 on each clevis half 16, 18. Each single cantilevered beam 954 has a remote end 956 opposite a base support 958. In this embodiment, base support 958 is at one edge 962 of its clevis half, and the cantilevered beam 954 extends substantially entirely across the clevis half to opposite edge 964 and remote end 956.

Beam 954 comprises a body 960 having a plurality of milled slots 962A therein. The number of milled slots may be chosen for a desired amount of deflection. The higher the number of slots, the greater the deflection allowed. Multiple thin beams, such as are created from the body 960 with milled slots 962A, store more energy than a solid beam, and at a lower stress level.

A first beam 954 on one side of its sensor body has a cantilevered beam 954 that extends from support 958 at edge 962 to edge 964. In this embodiment, a second beam 954' on the other side of the sensor body, has a cantilevered beam 954' that extends from its support 958' at edge 962 to edge 964.

Beam 954 is strapped to sensor body with a strap 524 attached between the sensor body and end 956 in similar fashion to the strapping of beams 504A and 504B described above, but is only attached between its own outer plate (e.g., clevis half 18) and the sensor body, not between both outer plates (e.g., clevis halves 16 and 18). Beam 954' is strapped to sensor body with a strap 524 attached between the sensor body and end 956' in similar fashion to the strapping of beams 504A and 504B described above, but is only attached between its own outer plate (e.g., clevis half 16) and the sensor body, not between both outer plates (e.g., clevis halves 16 and 18).

In the embodiment illustrated, remote ends 956 and 956' are at opposite edges of the sensor body, and beams 954 and 954' extend in opposite directions. With this configuration, forces of tension provided by the strap connections between the beams 954, 954' and the sensor body are balanced, so that no net torque is imparted on the system.

In one embodiment, each beam 954, 954' is approximately 20 inches long, and approximately one inch tall, with four pockets 962A milled in bodies 960, 960'. However, it should be understood that more or fewer pockets 962A may be used without departing from the scope of the disclosure.

In another embodiment, flexure components such as beams 904A, 904B, 924A, 924B, 954, and 954' may be formed separately from the clevis halves 16, 18, and bolted thereto to provide tensioning for the sensor body. In this embodiment, a different material could be used, such as alloys that have different spring tensions and/or materials that respond in more predictable ways to temperature changes. For example, beams such as beams 904A, 904B, 924A, 924B, 954, and 954' may be formed from a material such as NI-SPAN-C®, which can be processed to have a constant modulus of elasticity at temperatures from −50 to 150° F.

Figure 43:
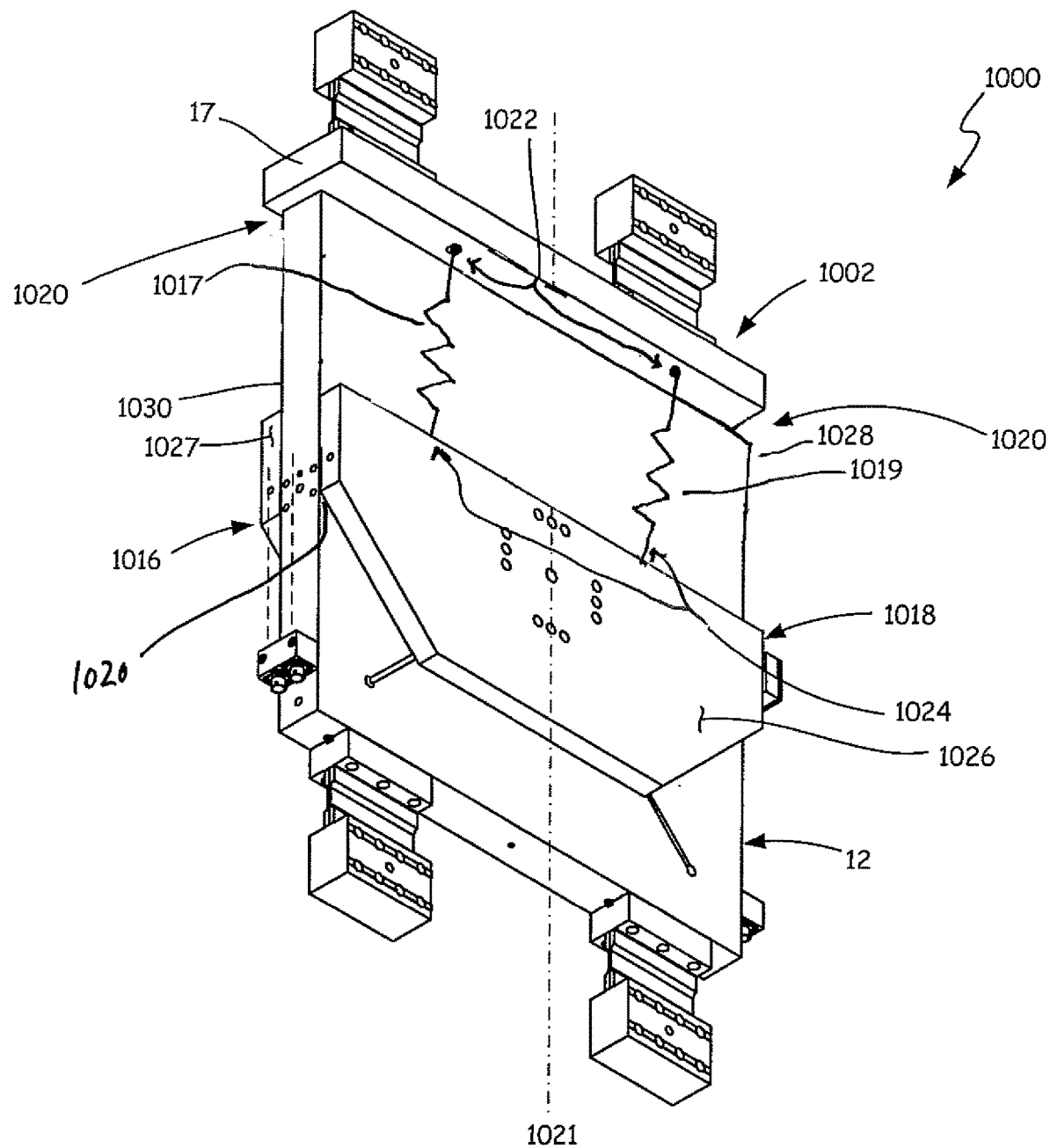
FIG. 43 is a perspective view of a transducer assembly according to still another embodiment of the present disclosure.

FIG. 43 illustrates a transducer assembly 1000 having many of the same components of the prior transducer assemblies, the parts of which have been identified with the same reference numbers. In transducer assembly 1000, as in the earlier embodiment, clevis halves 1016 and 1018 sandwich a sensor body 12, for example, similar to that illustrated in FIG. 2. A sensor body 12, for example, similar to that illustrated in FIG. 2 includes a rigid perimeter structure 22 identified in FIGS. 35 and 37-39. A biasing structure 1002 is operably formed from portions of the clevis halves 1016 and 1018 and coupled to the sensor body 22. In this embodiment, the biasing structure 1002 for clevis half 1018 includes spring assemblies 1017 and 1019 formed as an upper portion of clevis half 1018. An identical structure is provided for clevis half 1016, but is not shown.

Clevis half 1018 is separated from the sensor 12 by a gap 1020. First and second spring assemblies 1017 and 1019 are disposed on opposite sides of center line 1021. Spring assemblies 1017 and 1019 each have a first end 1022 coupled to connecting member 17 and a second end 1024 joining body 1026 of clevis half 1018. Clevis halves 1016, 1018 are coupled to the perimeter body 22 of the sensor 12. Spring assemblies 1017, 1019 allow tensioning along a center line 1021 of the transducer assembly 1000 at a midpoint between edges 1028 and 1030. Spring assemblies 1017 and 1019 are shown in schematic form. It should be understood that different forms of springs and assemblies may be used without departing from the scope of the disclosure. For example, a milled spring assembly, coil spring assembly, or the like, could be used without departing from the scope of the disclosure. The spring assemblies 1017, 1019 can be formed integral with each respective clevis halve 1016, 1018 as a single unitary body.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A transducer body, comprising:
   a support comprising a pair of clevis halves including a first clevis half and a second clevis half; and
   a sensor body coupled to each of the clevis halves, wherein the sensor body is disposed between the clevis halves and includes a generally rigid peripheral member disposed about a spaced-apart central hub, the central hub being joined to each of the clevis halves with the peripheral member spaced apart from each clevis half, wherein at least three flexure components couple the peripheral member to the central hub, and wherein the flexure components are spaced-apart from each other at generally equal angle intervals about the central hub; and
   a biasing assembly connected between the support and the sensor body and configured to provide a bias force between the sensor body and the support.

2. The transducer body of claim 1, wherein the biasing assembly comprises a pair of cantilevered beams, a first cantilevered beam extending from a first side of the transducer body on the first clevis half, and a second cantilevered beam extending from a second, opposite, side of the transducer body on the second clevis half.

3. The transducer body of claim 2, wherein the biasing assembly further comprises a biasing connector configured to operate in tension to provide the bias force.

4. The transducer body of claim 3, wherein the biasing connector comprises a strap coupled between the support and the sensor body.

5. The transducer body of claim 1, wherein the biasing assembly comprises a first cantilevered beam on the first clevis half, and a second cantilevered beam on the second clevis half.

6. The transducer body of claim 5, wherein the first cantilevered beam extends from a first side of the transducer body toward a second side of the transducer body, and wherein the second cantilevered beam extends from the second side of the transducer body toward the first side of the transducer body.

7. The transducer body of claim 5, wherein the first and the second cantilevered beams each comprise a plurality of slots therein, extending along a longitudinal length of a cantilevered portion of their respective cantilevered beams.

8. The transducer body of claim 5, wherein the biasing assembly further comprises a first biasing connector for the first cantilevered beam, and a second biasing connector for the second cantilevered beam, the first and second biasing connectors configured to operate in tension to provide the bias force.

9. The transducer body of claim 8, wherein the first biasing connector is coupled between the first cantilevered beam and the sensor body.

10. The transducer body of claim 8, wherein the second biasing connector is coupled between the second cantilevered beam and the sensor body.

11. The transducer body of claim 8, wherein the first and second biasing connectors each comprises a strap.

12. A transducer body, comprising:
    a support comprising a pair of clevis halves including a first clevis half and a second clevis half;
    a sensor body coupled to each of the clevis halves, wherein the sensor body is disposed between the clevis halves and includes a generally rigid peripheral member disposed about a spaced-apart central hub, the central hub being joined to each of the clevis halves with the peripheral member spaced apart from each clevis half, wherein at least three flexure components couple the peripheral member to the central hub, and wherein the flexure components are spaced-apart from each other at generally equal angle intervals about the central hub; and
    a biasing assembly connected between the support and the sensor body and configured to provide a bias force between the sensor body and the support, the biasing assembly comprising:

a flexible member fixedly connected to one of the sensor body or the support, the flexible member comprising a beam cantilevered from one of the sensor body or the support, the cantilevered beam including a plurality of slots therein; and a biasing connector to couple the flexible member to the other of the support or the sensor body.

13. The transducer body of claim 12, wherein the flexible member is integrally formed from a single unitary body of one of the sensor body or the support.

14. The transducer body of claim 13, wherein the flexible member is provided on the support.

15. The transducer body of claim 14, wherein the flexible member is provided on each clevis half.

16. The transducer body of claim 15, wherein the flexible member of the first clevis half extends from a first side of the transducer body, and wherein the flexible member of the second clevis half extends from a second opposite side of the transducer body.

17. The transducer body of claim 16, wherein the flexible member of the first clevis half and the flexible member of the second clevis half extend in substantially parallel directions toward each other from their respective sides of the transducer body.

18. The transducer body of claim 12, wherein the flexible member comprises a pair of flexible members, a first flexible member on the first clevis half, and a second flexible member on the second clevis half, wherein the first flexible member extends substantially fully across a width of the first clevis half from a first edge of the transducer body to a second edge of the transducer body, and wherein the second flexible member extends substantially fully across a width of the second clevis half from the second edge of the transducer body to the first edge of the transducer body.

19. The transducer body of claim 12, wherein the biasing connector to couple the flexible member to the other of the support or the sensor body is a strap.

20. A transducer body, comprising:

a support comprising a pair of clevis halves; and a sensor body coupled to each of the clevis halves, wherein the sensor body is disposed between the clevis halves and includes a generally rigid peripheral member disposed about a spaced-apart central hub, the central hub being joined to each of the clevis halves with the peripheral member spaced apart from each clevis half, wherein at least three flexure components couple the peripheral member to the central hub, and wherein the flexure components are spaced-apart from each other at generally equal angle intervals about the central hub; and a biasing assembly connected between the support and the sensor body and configured to provide a bias force between the sensor body and the support, the biasing assembly comprising a pair of biasing connectors, wherein a biasing connector is provided for each of opposite portions of the transducer body that are symmetrical, each biasing connector comprising a cantilevered beam with one of the biasing connectors connected to one of the cantilevered beams, each cantilevered beam comprising a plurality of slots therein extending along a length of a cantilevered portion of the cantilevered beam.

* * * * *